United States Patent [19]
Kostreski et al.

[11] Patent Number: 5,729,825
[45] Date of Patent: Mar. 17, 1998

[54] TELEVISION DISTRIBUTION SYSTEM AND METHOD USING TRANSMITTING ANTENNAS ON PERIPHERIES OF ADJACENT CELLS WITHIN A SERVICE AREA

[75] Inventors: Bruce Kostreski, Wheaton, Md.; Allan Schneider, Falls Church, Va.

[73] Assignee: Bell Atlantic Network Services, Inc., Arlington, Va.

[21] Appl. No.: 409,443

[22] Filed: Mar. 24, 1995

Related U.S. Application Data

[63] Continuation-in-part of Ser. No. 405,685, Mar. 17, 1995, Pat. No. 5,659,353.

[51] Int. Cl.$^6$ .............................. H04N 7/00; H04N 5/38
[52] U.S. Cl. .................... 455/3.1; 455/33.1; 455/51.2; 348/21
[58] Field of Search ...................... ; 348/21, 385, 348/386, 387, 469, 471, 472, 723, 724; 455/3.1, 3.2, 31.1, 32.1, 33.1, 51.1, 51.2, 52.1, 52.2, 52.3; 342/360, 367; 343/810, 879; 375/200; 370/18; H04N 7/13, 7/00, 7/20, 5/38

[56] References Cited

U.S. PATENT DOCUMENTS

| | | |
|---|---|---|
| 2,629,816 | 3/1953 | Rabuteau . |
| 3,836,726 | 9/1974 | Wells et al. . |
| 4,144,496 | 3/1979 | Cunningham et al. . |
| 4,255,814 | 3/1981 | Osborn . |
| 4,506,387 | 3/1985 | Walter . |
| 4,570,265 | 2/1986 | Thro . |
| 4,718,109 | 1/1988 | Breeden et al. . |
| 4,731,866 | 3/1988 | Muratani et al. . |
| 4,747,160 | 5/1988 | Bossard . |
| 4,792,849 | 12/1988 | McCalley et al. . |
| 4,890,320 | 12/1989 | Monslow et al. . |
| 4,991,164 | 2/1991 | Casiraghi et al. . |
| 4,995,078 | 2/1991 | Monslow et al. . |
| 5,038,403 | 8/1991 | Leitch . |
| 5,117,503 | 5/1992 | Olson . |
| 5,127,101 | 6/1992 | Rose, Jr. . |

(List continued on next page.)

OTHER PUBLICATIONS

Caffrey, J., "MMDS (Wireless Cable): An Alternative Delivery Medium for Digital Terrestrial Television," International Broadcasting Convention, 16–20 Sep. 1994, Conference Publication No. 397. ©IEE, 1994.

Lambert, Peter, "FM Wireless TV to Bite the Apple," Broadcasting, Dec. 21, 1992, pp. 46–47.

Enhanced Video Response System –VRS Phase II –by Hirohito Nakajima, Engineering Bureau, NTT, *Japan Telecommunications Review* (Jul. 1979).

*Primary Examiner*—David E. Harvey
*Attorney, Agent, or Firm*—Lowe, Price, LeBlanc & Becker

[57] ABSTRACT

A cellular system for distributing a plurality of television programs in a desired service area. A plurality of groups of spaced transmitting antennas are disposed substantially on the peripheries of adjacent cells disposed in the service area. The antennas are directional and directed to propagate substantially simulcast signals into the cell with which the antenna is associated so that the propagation patterns of the transmitting antennas associated with the cell overlaps over substantially a major portion of the area enclosed within the cell. Antennas disposed substantially on the peripheries of adjacent cells propagate directional signals into each of the adjacent cells. In a broadcast version the frequencies of the signals transmitted by all of the antennas are the same. In a dedicated service version the frequencies of the signals transmitted into adjacent cells are different. In the broadcast version an omni-directional antenna may be utilized in a centrally located disposition in the overall service area. The signals are broadcast as spread spectrum signals and the receivers include despreaders with Rake capabilities. Provision may be made for increasing the transmitted power of selected antennas to counteract adverse atmospheric conditions such as rain. The system may be used to provide video-on-demand and other interactive video services.

56 Claims, 16 Drawing Sheets

U.S. PATENT DOCUMENTS

| | | |
|---|---|---|
| 5,128,925 | 7/1992 | Dornstetter et al. . |
| 5,230,086 | 7/1993 | Saul . |
| 5,231,494 | 7/1993 | Wachob . |
| 5,239,671 | 8/1993 | Linquist et al. . |
| 5,239,672 | 8/1993 | Kurby et al. . |
| 5,243,598 | 9/1993 | Lee . |
| 5,268,933 | 12/1993 | Averbuch . |
| 5,274,666 | 12/1993 | Dowdell . |
| 5,280,472 | 1/1994 | Gilhousen et al. . |
| 5,345,599 | 9/1994 | Paulraj et al. . |
| 5,355,529 | 10/1994 | Linquist et al. . |
| 5,390,166 | 2/1995 | Rohani et al. . |
| 5,404,575 | 4/1995 | Lehto . |
| 5,412,426 | 5/1995 | Totty . |
| 5,428,818 | 6/1995 | Meidan et al. . |

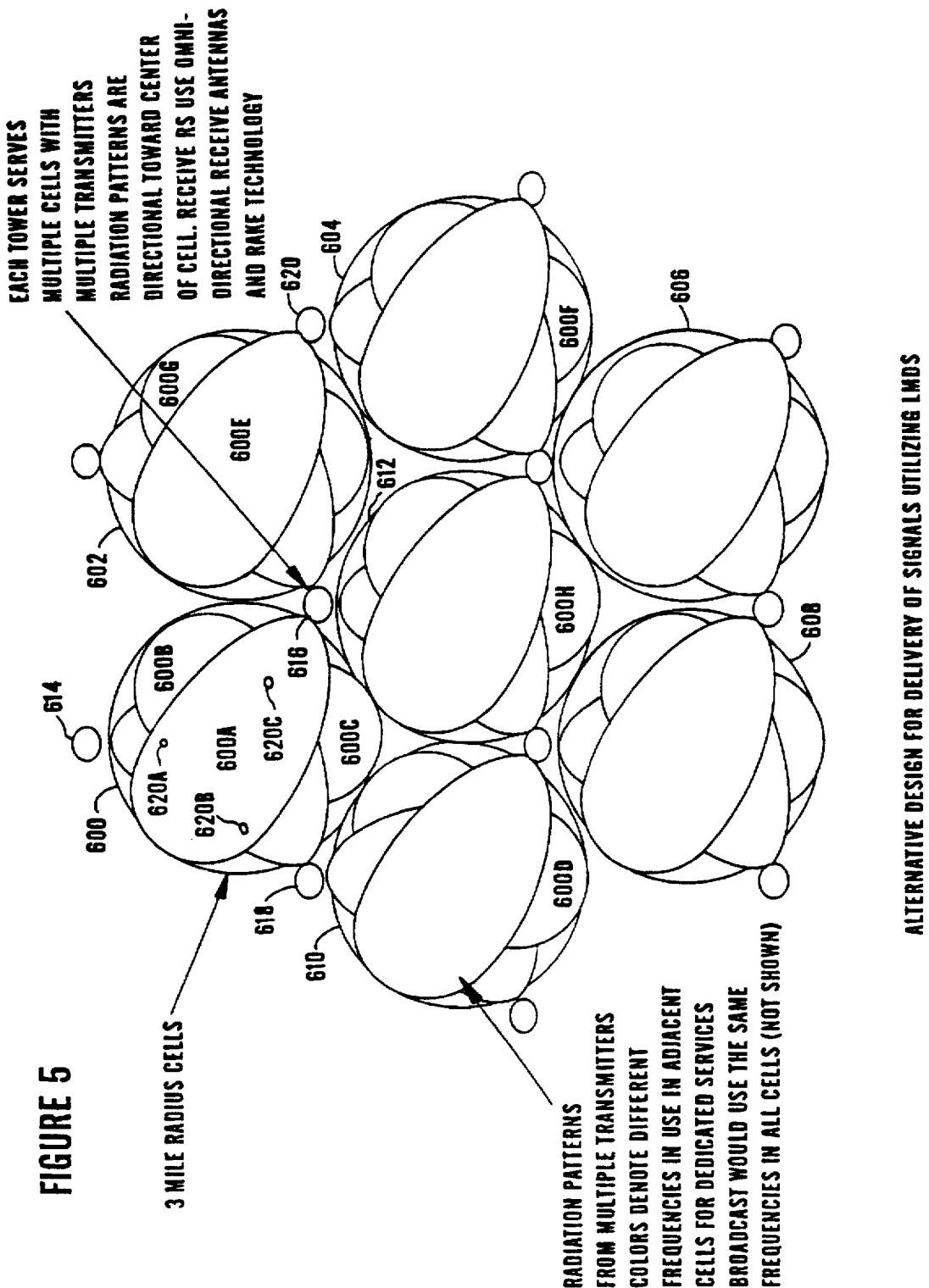

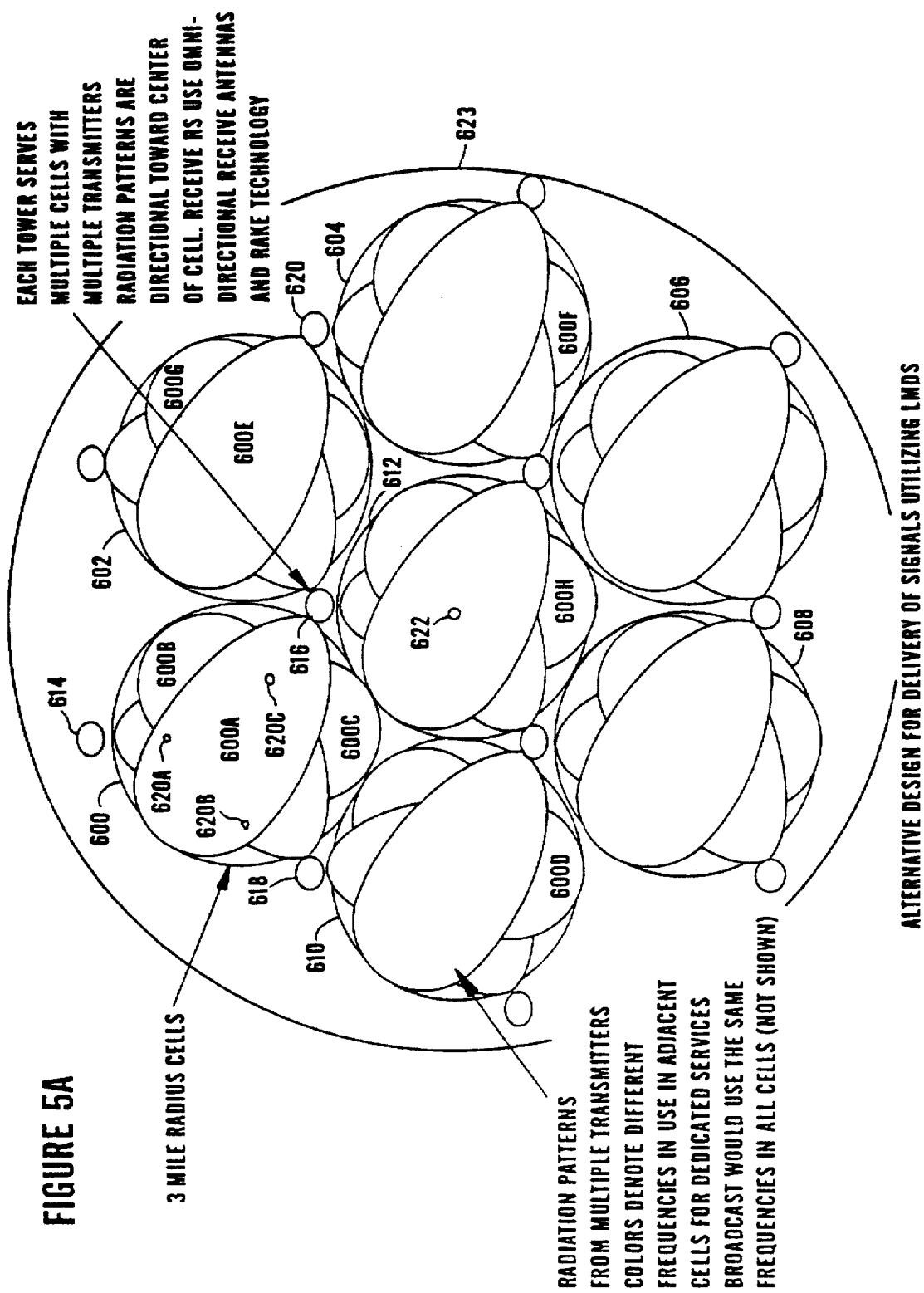

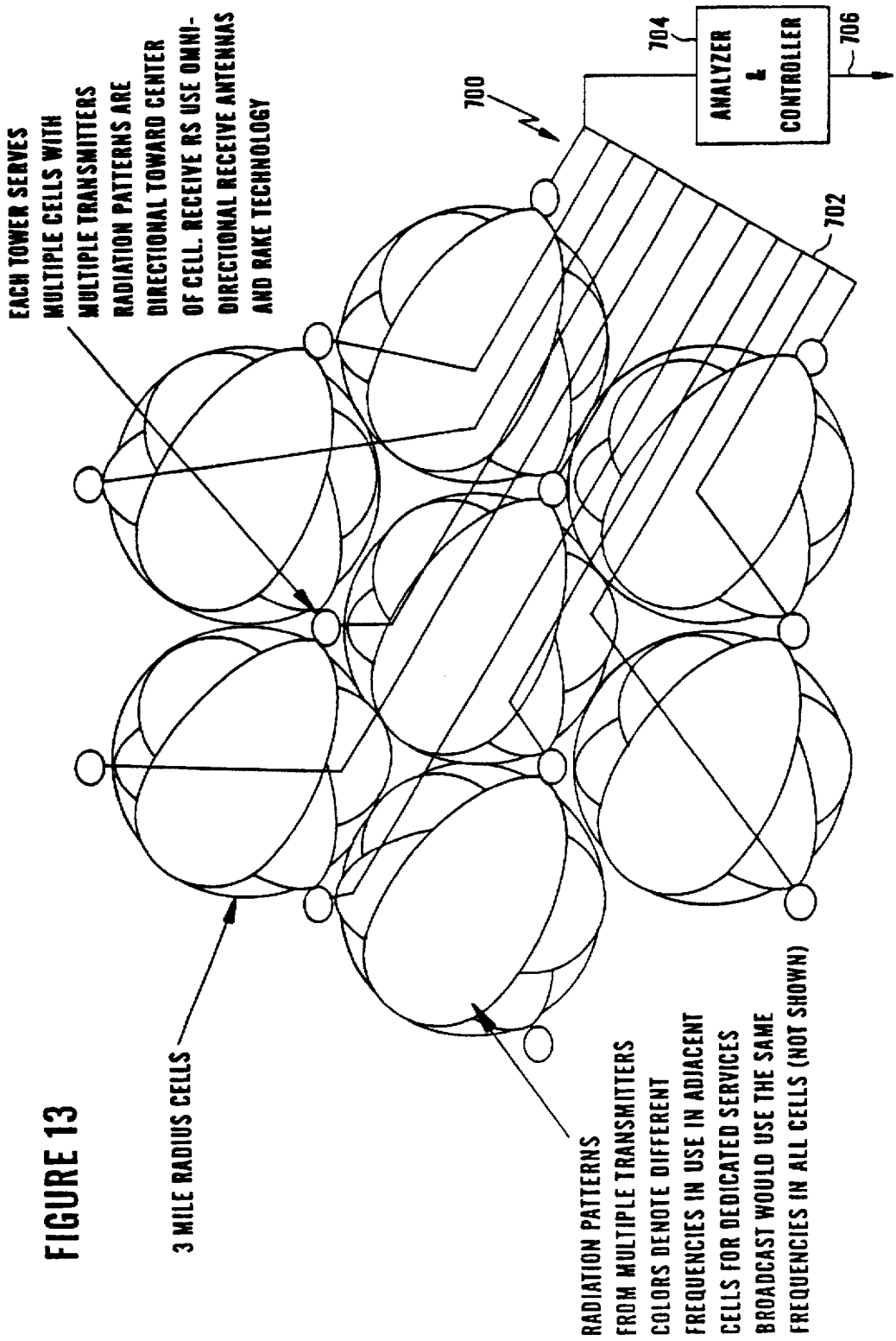

TELEVISION DISTRIBUTION SYSTEM AND METHOD USING TRANSMITTING ANTENNAS ON PERIPHERIES OF ADJACENT CELLS WITHIN A SERVICE AREA

RELATED APPLICATIONS

This application is a continuation-in-part of U.S. patent application Ser. No. 08/405,605 filed Mar. 17, 1995 now U.S. Pat. No. 5,654,353 (Atty. Docket No. 680-117) entitled "Television Distribution System and Method", which application is incorporated herein by reference.

TECHNICAL FIELD

The present invention relates to wireless distribution of program information, e.g., video, audio and data. More specifically, the present invention relates to simultaneous distribution of multiple RF channels through a local multipoint distribution service cellular television system.

BACKGROUND ART

"Wireless cable" is a term usually used to refer to a multi-channel video distribution medium that resembles franchise cable television, but which uses microwave channels rather than coaxial cable or wire to transmit programming to the subscriber. Programming for wireless cable systems is received at the headend of the wireless cable system in the same manner as it is for landline based cable television. These programs are then retransmitted, utilizing the high end of the Ultra High Frequency (UHF) portion of the microwave radio frequency spectrum (2.1 to 2.7 GHz), by a microwave transmitting antenna located on a tower or other tall structure to small antennas on subscriber rooftops, typically within a 40 mile radius. As a general matter, the transmission of wireless frequencies requires clear line-of-sight (LOS) between the transmitter and the receiving antenna. Buildings, dense foliage and topography can cause signal interference which can diminish or block signals. Certain LOS constraints can be reduced by increasing transmission power and using engineering techniques such as pre-amplifiers and signal repeaters.

To the subscriber, wireless cable operates as a cable look-alike service. At the subscriber's location, microwave signals are received by an antenna, downconverted and passed through conventional coaxial cable to a descrambling converter located on top of a television set. The signals are converted at the antenna location to lower frequencies in order to be carried over conventional in-house cable to a converter box, decoded and then output to a standard television set. Because wireless cable signals are transmitted over the air rather than through underground or aboveground cable networks, wireless systems are less susceptible to outages and are less expensive to operate and maintain than franchise cable systems. Most service problems experienced by wireless cable subscribers are homespecific rather than neighborhood-wide, as is frequently the case with franchise cable systems.

The evolution of wireless cable may be briefly summarized as follows. Wireless cable technology has existed in a single channel version for commercial purposes since the 1970's and had been available even longer for educational use. In mid-1983, the FCC, invoking the need to promote competition with conventional cable television systems, established a change in the rules for using a portion of the microwave spectrum previously designated for educational use. In the past, 28 microwave channels had been available to accredited and non-profit educational organizations for educational use exclusively by Instructional Television Fixed Service (ITFS) operators. Rules reallocated eight of those channels for outright commercial use, and educational organizations were permitted to lease excess hours to commercial operators on the remaining 20 channels. In any local market, this makes it possible for a commercial operator to combine any or all of those 28 channels with five other channels already available for commercial use. Under current FCC rules, the available spectrum results in a maximum of 33 analog channels. This number of 'wireless cable' channels is less than the number offered on many competing franchise type cable television systems.

The 33 channels potentially available to wireless cable operators thus are subdivided into two types of channels. Twenty channels are referred to as ITPS. The remaining 13 channels are generally referred to as Multichannel Multipoint Distribution Service (MMDS).

Since 1983 spectrum blocks in the 2.1–2.7 GHz range have been allocated for the purpose of delivering video content from a single transmit site to multiple receive locations. A total of 198 Mhz has been allocated for downstream transmissions for the wireless cable service. The channelization and transmission modulation (6 Mhz amplitude modulation/vestigial side band) are equivalent to broadcast TV or cable but up-converted to microwave frequencies.

The current UHF spectrum was originally licensed in blocks of four video channels each separately licensed, with each block allocated to a specific purpose. Five groups, each with four channels, were allocated to Instructional Television Fixed Service (ITFS). ITPS spectrum was initially made available only to educational institutions. Two groups of four channels were made available to anyone wishing to provide an alternative multi-channel video program service. The final four channels were licensed individually to institutions for the purpose of providing a private video network. Over time, the FCC relaxed some of these operational rules. Through licensing and leasing arrangements, the FCC now allows all of the channels to be aggregated for the purpose of providing an alternative to cable television.

In many ways, current typical UHF wireless TV is equivalent to a low tier franchise cable television system (i.e. having relatively few channels), with the only real difference lying in the medium used to transport signals from the headend to the customer. Functionally identical headend equipment is utilized in both systems. In the case of UHF service, signals leave the headend via a microwave transmitter. With cable television, the same signals leave the headend on fiber or coaxial cable facilities.

Wireless cable technology provides a relatively low cost medium to transmit video and does not require extensive coaxial cable networks, amplifiers and related equipment. In a typical prior art system, such as shown in FIG. 1, a headend system H receives up to a maximum of 33 analog television program signals from a variety of satellite downlink receivers and other types of receivers, in the exact same manner as for a cable television system. The headend system H frequency multiplexes those television program signals into a combined spectrum signal in the 50–450 Mhz range. This combined signal has a frequency distribution similar to that found on a cable television network. The headend system up-converts the combined spectrum signal to the UHF frequency range, typically centered around 2.6 GHz. The headend system supplies the UHP signal to a single transmitter antenna tower T which broadcasts the signal to subscribers who each have an individual home receiving system. Subscribers can call in to the headend to order pay-per-view events via the telephone network, and the headend transmits codes to the subscribers systems to enable descrambling of encoded pay-per-view programs.

FIG. 1A shows a typical service area for a wireless cable type system of the type shown in FIG. 1. In accord with relevant regulations, the wireless cable operator has a protected or 'primary' reception area P. At the relevant frequencies here under consideration, the primary area P is a circle having a radius of 15 miles from the operator's transmitter T. Within this area, the operator is guaranteed that there will be no interference with his transmissions on the assigned frequency channel(s). However, at the allowable power levels, the transmissions from antenna tower T will propagate out over a secondary area S having a radius of up to 40 miles. Within the secondary area, some locations will receive sufficient signal strength to utilize the wireless cable services.

UHF signals in the relevant frequency band arrive at the customer location by direct line-of-sight (LOS) transmission. Typically an elliptical dish shaped antenna 18–36 inches long, formed of parallel curved elements, is aimed from the subscriber location to receive the strongest signal from the transmitter. The captured signals are down-converted at the antenna from the microwave band to the broadcast band and transmitted via coaxial wiring into the house. For scrambled signals (the typical case), a set top converter functionally similar to a cable set top box is used. In many UHF installations, to conserve UHF capacity for premium services, a VHF/UHF off-air broadcast receive antenna is installed with the UHF antenna to pick up the local programming.

Propagation characteristics at the relevant UHF operating frequencies require line-of-sight/LOS) between the transmit and receive antennas for reliable service reception. Both natural obstructions such as hills and vegetation, and man-made obstructions such as buildings, water towers and the like, limit the actual households capable of receiving an LOS transmission. FIG. 1A also shows a simplified example of one such obstruction O. As illustrated, the obstruction O is within the primary reception area P. The obstruction blocks line-of-sight transmissions from transmitter antenna tower T in a radially extending blockage or shadow area B. Receiving systems within this area can not receive the transmissions from antenna T, and potential customers in that area B can not subscribe to the wireless cable services broadcast from that tower.

One solution to the blockage problem has been to provide repeaters. A repeater receives the primary transmission from tower T on the tower side of the obstruction, amplifies the signal if necessary, and retransmits the signal into the area of blockage. This may be an effective solution to one blockage or obstruction O, but in many major metropolitan areas there are many obstructions. The power levels of such repeaters tend to be low, and overcoming blockages due to distortions that result when amplifying combined RF channels caused by many different obstructions to the primary transmissions would require an inordinate number of repeaters. Also, because of delays and multipath effects, repeater transmissions may interfere with reception from the primary source in areas close to the blockage area B.

Besides signal blockage, several other propagation factors can affect reliable UHF service delivery. One factor is multi-path reflections of the desired signal arriving at the receiver by way of differing paths and therefore arriving with slight delay. For analog video signals, multi-path appears as ghost images on the viewer's TV. For digital signals, multi-path can cause intersymbol interference that results in multiple bit errors. In either case, near-coincident multi-path signals can cause a degree of signal cancellation that looks like additional propagation loss. Multi-path also results from reflections and diffraction.

Path fading is another significant coverage factor. Time-variant path fading can result from atmospheric effects, e.g., rain or temperature and pressure inversions. Rain can act to partially reflect or absorb the microwave signals. Weather inversions can result in an upward bending of the wave front due to refraction. There are engineering measures to mitigate the troublesome effects of time-variant path fading, such as suitable fade margins and antenna diversity.

It has also been proposed to distribute television signals through a low power cellular system. U.S. Pat. No. 4,747, 160, issued on May 24, 1988, to Bernard Bossard for a "Low Power Multi-Function Cellular Television System" is directed to such a system.

The Bossard Patent describes a low power cellular television system using a plurality of conventional cells served by omni-directional base antennas and directive receiving antennas. The system employs polarization diversity to substantially decrease intermodulation distortion. An array of transmitting antennas is organized such that horizontally and vertically polarized transmitters alternate throughout the system.

Each receiver has an appropriate narrow beam width antenna which is directed at a specific transmitting antenna and adapted to receive signals only of the frequency and polarization of the transmitting antenna. Isolation is achieved between neighboring transmission systems by means of polarization, amplitude, adjustment, modulation techniques, frequency and space diversity as well at through the use of high Q filtering. This isolation allows additional services such as two-way television, digital data two-way transmission, video teleconferencing, radio programming and telephone service. If transmission from the transmitter to the receiver is made with vertically polarized signals, then the receiver will preferably transmit back with horizontally polarized signals.

The overall organization of the antenna array of the Bossard Patent is illustrated in FIG. 2. The array of transmitting antennas is comprised of horizontally polarized transmitting antennas T204 and vertically polarized antennas T206 each inside a cell 214H or 214V. The transmitting antennas are omni-directional and each has associated with it a group of receiving antennas including horizontally polarized antennas and vertically polarized antennas. The system is designed for operation in the 27.5–29.5 GHz frequency bands with 10 mile diameter cells using low power transmitters and even lower powered repeaters. The use of low power transmitters is made feasible by the use of high gain, highly directional receiving antennas providing gains in the range of 30–40 dB with a pattern divergence of approximately 2°.

A further problem in providing an ever increasing scope of wireless communication services, including broadcast services such as television and interactive television, is limited spectrum availability. This limitation is forcing a continuing move to higher frequencies accomplished with the problems related to such high frequencies. Spectrum significantly above the MMDS range of approximately 2.5 GHz and particularly above the 28 GHz frequency of the type systems described in the above referenced Bossard Patent encounter serious weather phenomena attenuation and increased equipment cost.

Clearly a need exists for a broadcast system providing adequate propagation coverage, reduction of areas of blockages, and elimination of the necessity for virtually pin-point aiming of directional antennas. Any such system should also provide a high number of programs with good signal quality throughout the entire reception or service area. It is also desirable to minimize multipath interference and degradation of service due to fading.

It is still further desirable to provide a service that is amenable to use in the 28.5 GHz band and preferably above.

DISCLOSURE OF THE INVENTION

The present invention provides methods and apparatus to address the above stated needs. The invention contemplates a cellular system operating in the high UHF frequency spectrum. According to a preferred embodiment the system may be envisioned as a series of relatively small, e.g., 3 mile or less radius, circular cells extending over the service area. Each cell is provided with multiple, by way of example three antenna sites, which may be arranged on the periphery of each cell at substantially equidistant spacings thereabout. All but the outermost service area antenna sites will serve multiple cells by propagating directional signals thereinto. Radiation patterns are directional toward the centers of the cells. The pattern of propagation of the antennas is selected so that the interiorly directed signals from the antenna sites surrounding each cell attain substantially complete cell coverage. According to the invention, the receivers use omni-directional antennas.

The invention contemplates an RF frequency simulcasting method for transmitting information from the multiple spaced antenna sites around each cell to multiple receiving sites in the cell reception area. In a broadcast service, all antennas and cells use the same frequency. For dedicated services, such as video-on-demand or interactive TV, different frequencies are used in adjacent cells with repetition of such frequencies in spaced cells. It is a feature of the invention that this cellular coverage may be used in conjunction with other signal distribution systems to eliminate gaps in coverage.

In a broadcast mode each antenna site transmits a signal including multiplexed channels simultaneously from the plurality of spaced transmitting sites surrounding each cell. In each cell the transmitting sites propagate the signal into substantially overlapping regions of at least a major portion or the intended reception area. At the receiver site, which may be subscriber premises, a terminal device frequently receives a signal containing a plurality of time delayed copies of the transmitted signal. At least a portion of the received signal is processed to acquire a single copy of a signal corresponding to a selected one of the multiplexed channels, and information contained in the acquired signal is presented, e.g. in a form that is sensorially perceptible to a user. In the preferred embodiments, the processing of multiple copies utilizes a delay equalization technique such as a Rake technique.

To increase the number of programs broadcast by a system operating in accord with the above simulcasting method, each of the multiplexed channels carries a multiplexed stream of digital data representing a plurality of programs. The programs may be audio or data, but in the currently preferred embodiment, the programs comprise audio/visual information such as television programming. In such a television system, each program is digitally encoded into compressed digital data. A multiplexer combines the compressed digital data for a group of programs into one of the digital multiplexed data streams for transport through one of the channels. The presentation of one program to a user entails selecting one of the channels, selecting data from the multiplexed stream of digital data carried in that channel, and reproducing the selected data as the sensorially perceptible information, e.g. as an audio/visual output through a television set.

In an exemplary implementation of the present invention, real-time encoders receive video programs and encode the information for those programs into packets of compressed digital data, e.g. in accord with a recognized video compression standard. The headend may also receive previously encoded video program material from other sources, such as a digital server or a digital transmission media. Multiplexers combine digital data for groups of programs into the multiplexed packet data streams. A digital modulator, such as a QPSK or 16 QAM modulator, modulates each digitally multiplexed packet data stream for transport in one unique channel. A combined spectrum signal containing these channels is up-converted to place the channels into available frequency channels in the UHF range. The combined spectrum signal is supplied to a plurality of microwave broadcast transmitters located at spaced apart sites about the service area or reception region.

The unique channel from each digital modulator is fed to an up-converter synthesizer module which performs a frequency hopping spread spectrum technique. The frequency synthesizer uses an input frequency hopping spreading code to determine the particular frequency from within the set of frequencies in the broad frequency band at which to periodically generate the carrier wave. Frequency hopping codes are input to the frequency synthesizer by a frequency hopping code generator so that the carrier wave is frequency hopped. Each carrier is assigned a different spreading code so that each occupies a different channel during the same time period. The spreading codes are preferably orthogonal to one another such that cross-correlation between the spreading codes is approximately zero. The signals from the up-converter synthesizer are then fed to a combiner to provide a high end UHF signal which is fed to the transmitting antennas. The signals are fed to the antennas for simultaneous transmission or for substantially simultaneous transmission with transmission delays which are compensated at the receiving end.

At the receiver site, an antenna receives a signal from at least one of the transmitters. Preferably, the receiving antenna is a gain antenna omni-directional in azimuth. The signal from the receiving antenna is downconverted and supplied to a wireless signal processor. The wireless signal processor, typically part of an interface module connected by a cable to the downconverter, processes the received wireless signal to select one of the channels. The wireless signal processor effectively acquires a digital multiplexed data stream from the selected channel and supplies that data stream to a digital signal processor.

The digital signal processor selects packets of data relating to a selected one of the programs. The digital processing section processes the compressed, digitized data from those packets to produce signals presentable to a user. In the preferred embodiment, the digital signal processor produces signals to drive a standard television set.

Particular transmitted signals are retrieved from the combined transmitted signal by despreading with a frequency hopping spreading code corresponding to the code for the particular transmitted signal which is to be retrieved. As will be understood by those skilled in the art the transmitting and receiving codes are synchronized. When the spreading codes are orthogonal to one another, the received signal can be correlated with a particular spreading code such that only the desired signal related to the particular spreading code is enhanced while the other signals are not enhanced. In the usual case multi-path signals will be encountered. The range of delays in reception of the multi-path reflected signals can be determined for any specific area and, by way of example, may be in the 10 microsecond range. In the wireless receiver a main receiver is synchronized to the simulcast signal. According to the invention the range of multi-path delays may be divided into discrete intervals, such as 2 microseconds, by way of example, and separate receivers may be provided which are synchronized to those delays. Thus assuming a range of multi-path delays of 10 microseconds and a 2 microsecond division of this range, five receivers may be provided in the wireless receiver. These may be synchronized to the main receiver at cumulative 2 microsecond delays to process signals arriving at the individual synchronized time periods. The output from the primary receiver and delayed sequence receivers are filtered, time synchronized, passed to the digital signal processor and thence to the television set.

Multiple purposes are served by this system and methodology. By use of multiple transmitters providing signals within the cell it is possible to obtain a more uniform signal level within the cell. The system may resolve not only the differences between the multi-cast signals, but also the multi-path reflections associated with each of those signals. The result is that both the use of multi-casting as well as the existence of the multi-path phenomena may be utilized to provide an improved signal to noise ratio. Thus, the multi-path signals which are conventionally objectionable are utilized to enhance reception.

According to one feature of the invention which is particularly advantageous at the higher UHF frequencies, attenuation due to rain may be substantially compensated and overcome to avoid or minimize signal loss. With three mile radius cells it frequently occurs that rain storms are of a similar size and may affect only a single or adjacent cells. According to this feature of the invention the transmitting antenna sites may be provided with sensors responsive to signal strength connected to a transmitter control station. Such sensors may provide detection of the attenuating effect of multiple atmospheric conditions such as rain, fog, snow or the like. When significant power power attenuation is detected the control station may cause upward adjustment of the power of the signals transmitted into a cell or into multiple adjacent cells identified by the sensors. According to the invention this additional power may be obtained without an increase in the total power consumption by transfer of power allocated to non-affected areas.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 5 depicts an array of cells and transmitting antennas and propagation patterns which may be utilized for a broadcasting embodiment of the present invention.

FIG. 5A depicts a variation of the array of cells and transmitting antennas of FIG. 5.

FIG. 13 depicts an embodiment of the invention utilizing signal strength sensors to minimize signal loss during localized atmospheric disturbances such as rainstorms, fog, snow or the like.

BEST MODE FOR CARRYING OUT THE INVENTION

Figure 1:
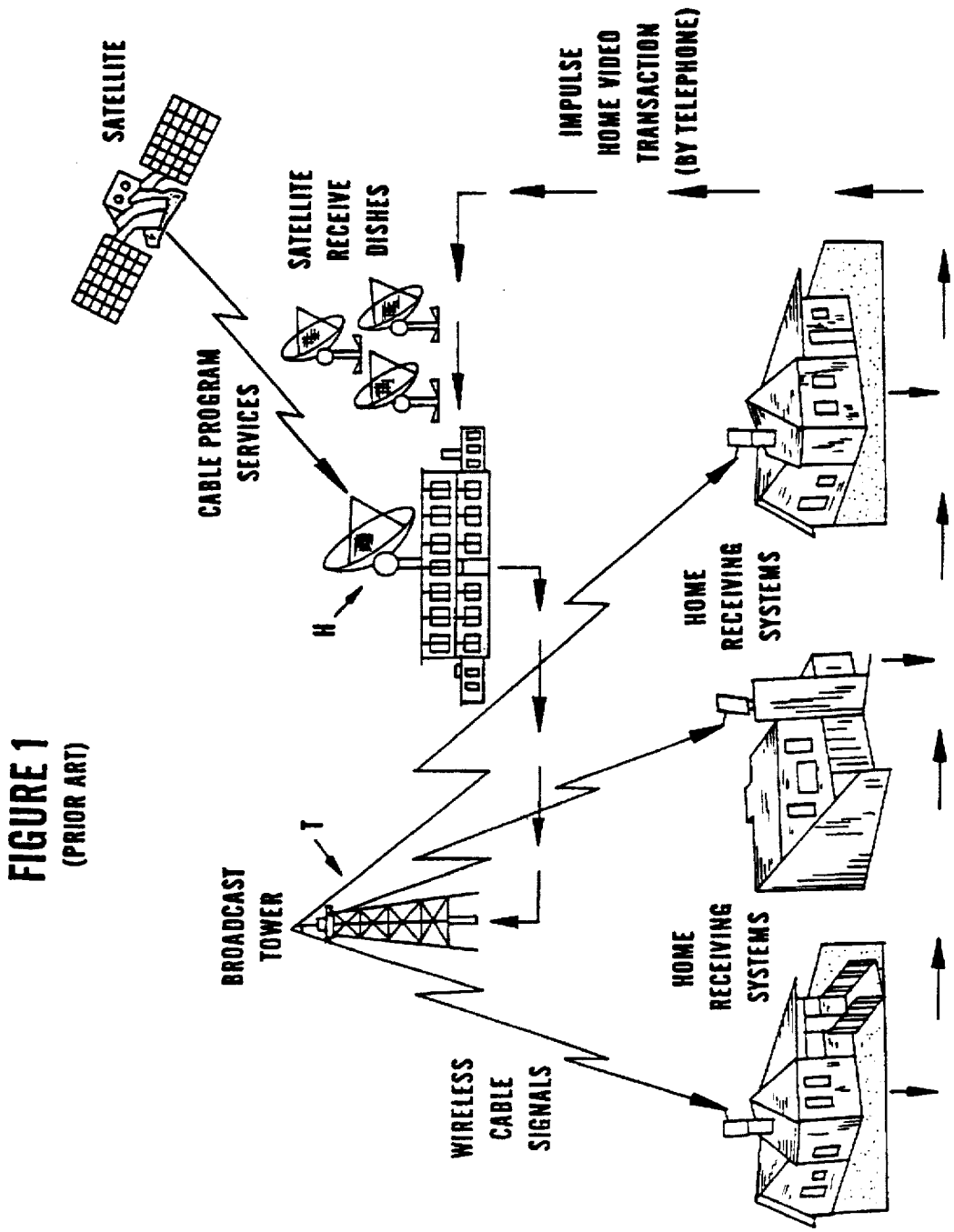
FIG. 1 is a simplified diagram of a prior wireless cable television system.
Figure 1A:
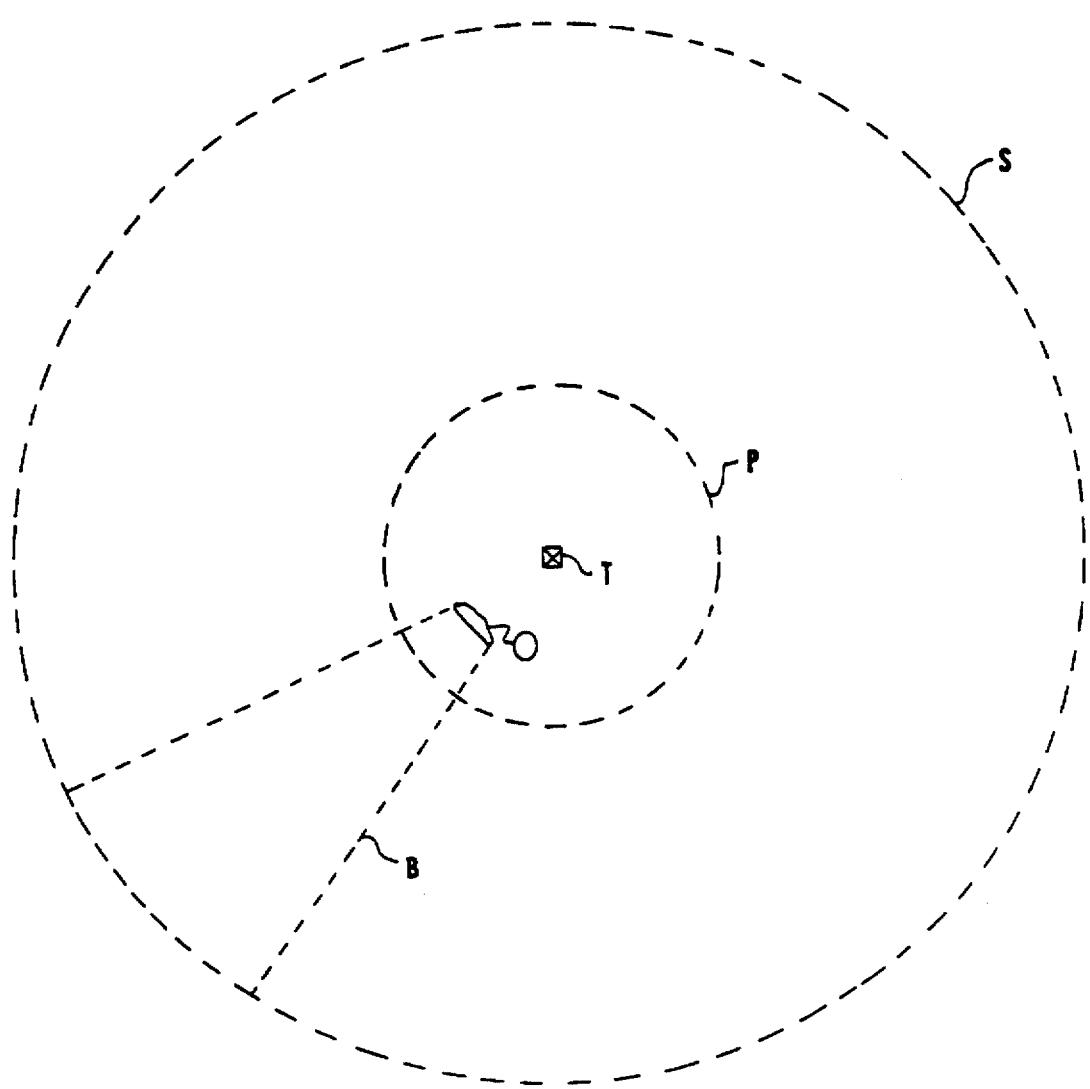
FIG. 1A shows service areas relating to a single wireless transmitter in the system of FIG. 1.
Figure 2:
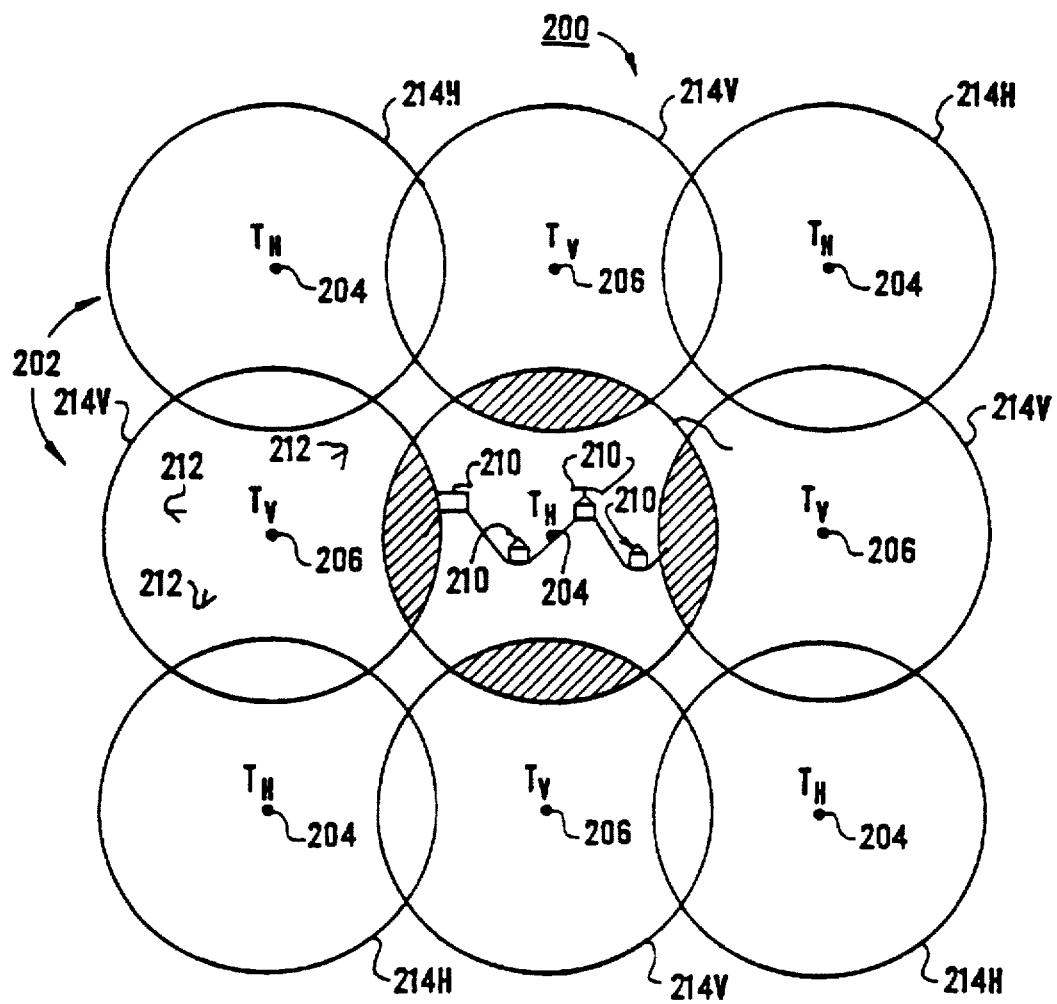
FIG. 2 shows the cell array and antenna arrangements proposed for delivery of television services using a system of the type described in the Bossard U.S. Pat. No. 4,747,160.
Figure 3:
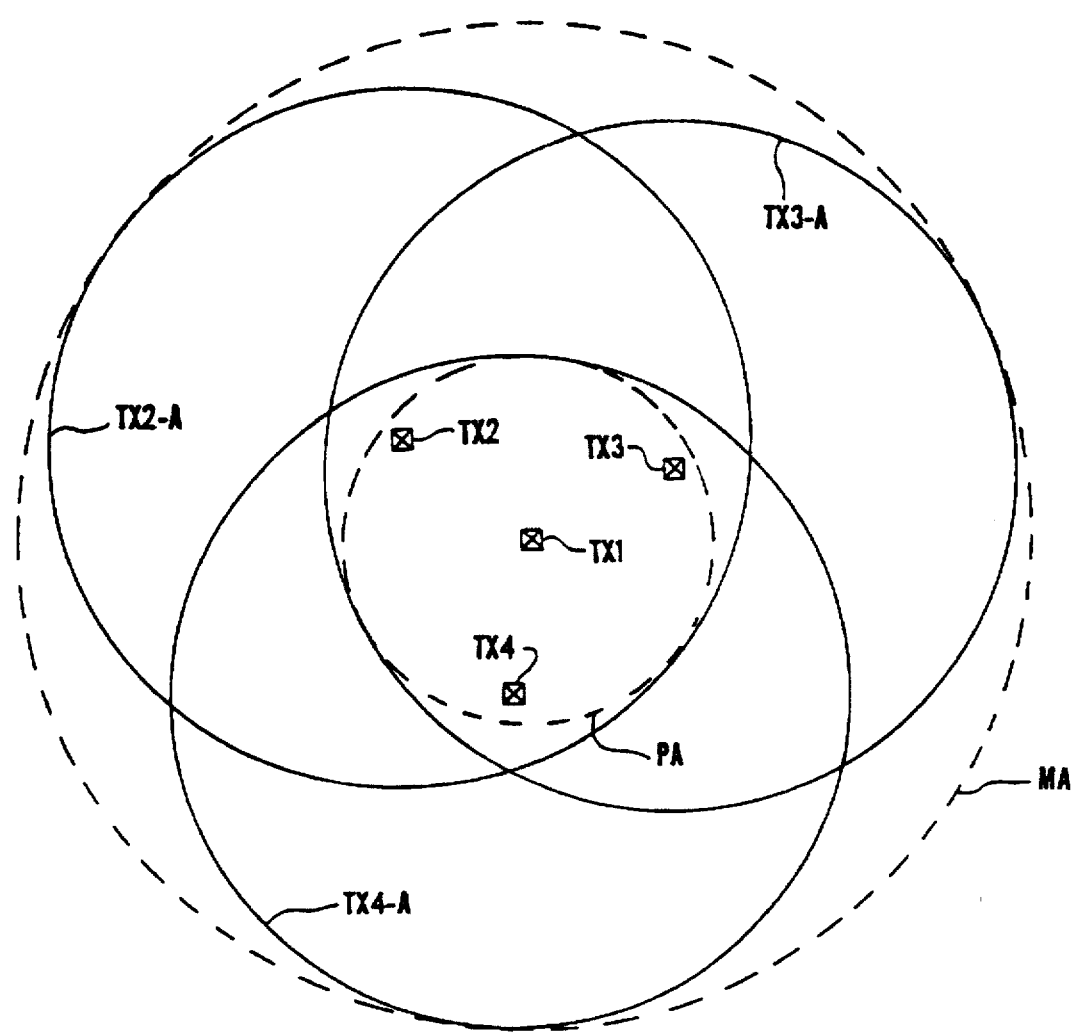
FIGS. 3 and 4 depict exemplary propagation areas for simulcast transmissions into a receiving area, in accord with the 2.6 GHz system described in the common assignee's copending patent application Ser. No. 08/405,685 filed Mar. 17, 1995, Atty. Docket No. 680-117).
Figure 4:
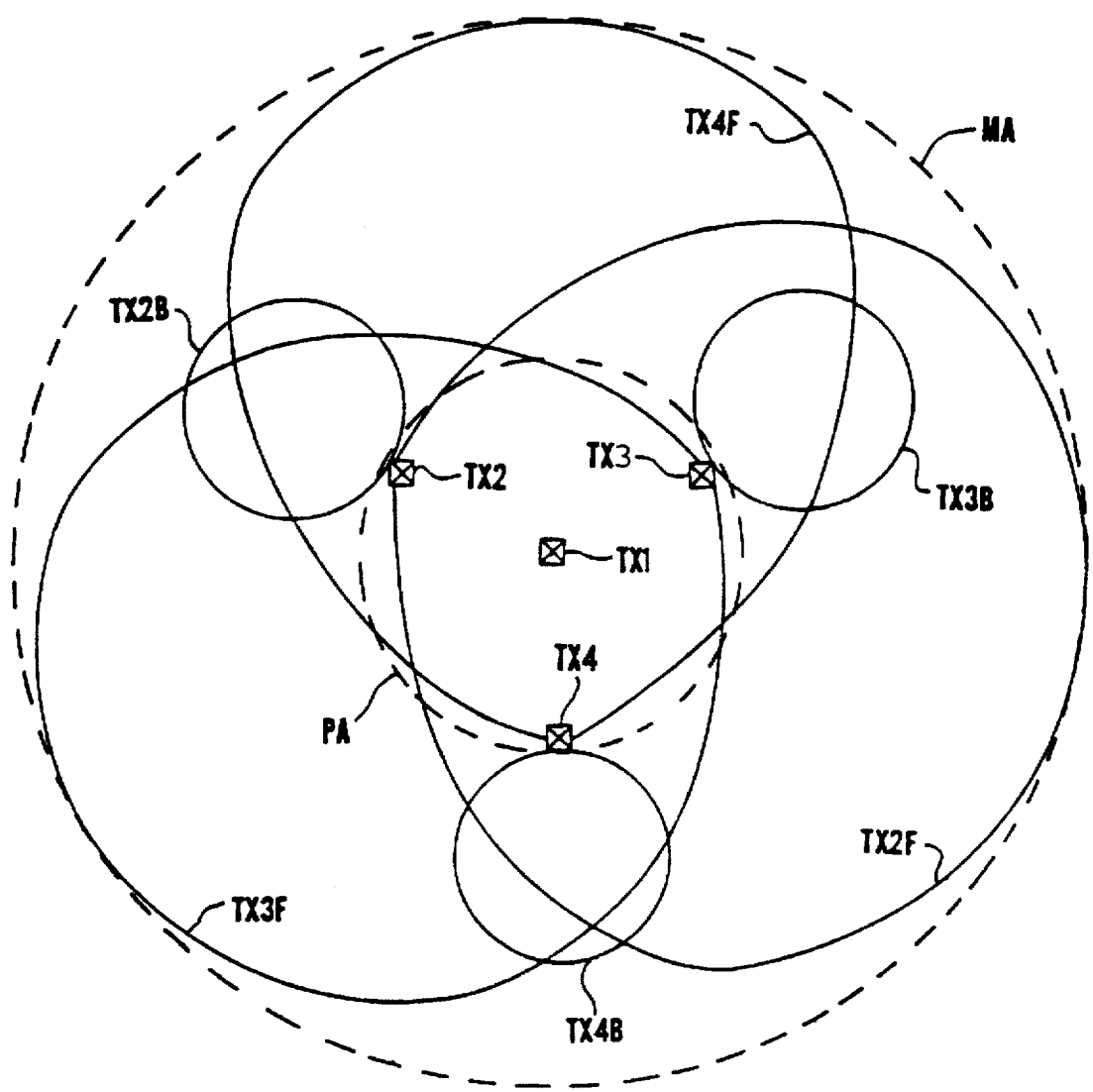

Referring to FIG. 5 there is shown an embodiment of the invention particularly suited to providing broadcast services such as multiple channel TV services over a service area defined by circular cells 600–612. At frequencies of 28–29 GHz and above, the cells may have a radius of approximately three miles. It will be understood that the complete service area may be made larger or smaller by adding or deleting cells. Each cell 600–612 is served by three antennas such as antennas 614, 616 and 618 located equidistantly around the periphery of the cell 600. The antennas propagate directional signals toward the center of the cell 600 as indicated by the lobes 600A, 600B and 600C. This pattern provides three lobe overlap over a major portion of the area of the cell 600. Each antenna 614, 616 and 618 is connected to a suitable transmitter system such as indicated by the Transmitter Systems 1-N in FIG. 6. The antennas 614, 616 and 618 substantially simulcast the same signal. Such substantial simulcasting may be simultaneously and in phase or substantially simultaneously as will be described. A plurality of receivers indicated at 620A, 680B and 680C are overlapped by the three lobes 600A, 600B and 600C.

The transmitting antennas which are substantially on the peripheries of adjacent cells, such as cells 600, 602, 610 and 612 transmit into the adjacent cells. Thus the antenna 618 transmits lobe 600B into cell 600 and lobe 600D into cell 610. In a similar fashion, the antenna 620 substantially on the peripheries of adjacent cells 602 and 604 transmits lobes 600E and 600F into cells 602 and 604 respectively. Antenna 616 which is substantially on the peripheries of three adjacent cells, transmits lobes 600A, 600G and 600H into cells 600, 602 and 612 respectively. The same pattern is repeated in the other cells by the antennas associated with those cells. This delivery of signal to the receivers 620A, 620B and 620C, in cell 600, by way of example, provides the respective receivers with more power in terms of received signal than would occur with any one lobe individually. Utilizing the spread spectrum and Rake technologies to be presently described, any delays or non-synchronization of the receipt of the signals is compensated.

It is also a feature of the invention that in a broadcast mode the directional antennas may be supplemented with one or more omni-directional antennas such as, by way of example, the centrally located antenna 622 shown in FIG. 5A. This antenna may provide an omni-directional circular pattern to further ensure coverage of the service area indicated at 623, and at the same time provide further prevention of signal loss due to such atmospheric phenomena such as rain. As previously stated, in this broadcast mode embodiment of the invention, all antennas transmit the same signal substantially simultaneously at the same frequency.

The supply of transmitter signals to the antennas in the array illustrated in FIG. 5 is now described.

In accord with the present invention, groups of program signals may be digitally encoded and compressed, and the compressed program streams time division multiplexed into digital transport streams. Each digital transport stream is modulated and/or up-converted into one RF channel, by way of example, a channel in the high end of the ultra high frequency (UHF) microwave range (e.g. 2.1 to 2.7 GHz), although other and higher frequency channels may be used. Separately located transmitters simultaneously or substantially simultaneously broadcast a UHF frequency signal containing all of the channels. As used herein the term substantially simultaneously includes simultaneously and simultaneously in phase. The transmitter antennas are located and the transmitter emission patterns are designed so that the waves from the transmitters propagate throughout substantially overlapping portions of each cell.

The simulcast transmissions from the broadcast antennae include a plurality of frequency multiplexed channels. Each channel contains a digital transport stream carrying a number of programs, in compressed digital form. The programs may be audio only programs, or data, but in the preferred embodiments, the programs are television type programs. The television type programs contain video and audio information, and may include data information, e.g. for closed captioning and the like. The system and method for transmitting the simulcast signals and receiving those signals within the service area are now briefly described.

Figure 6:
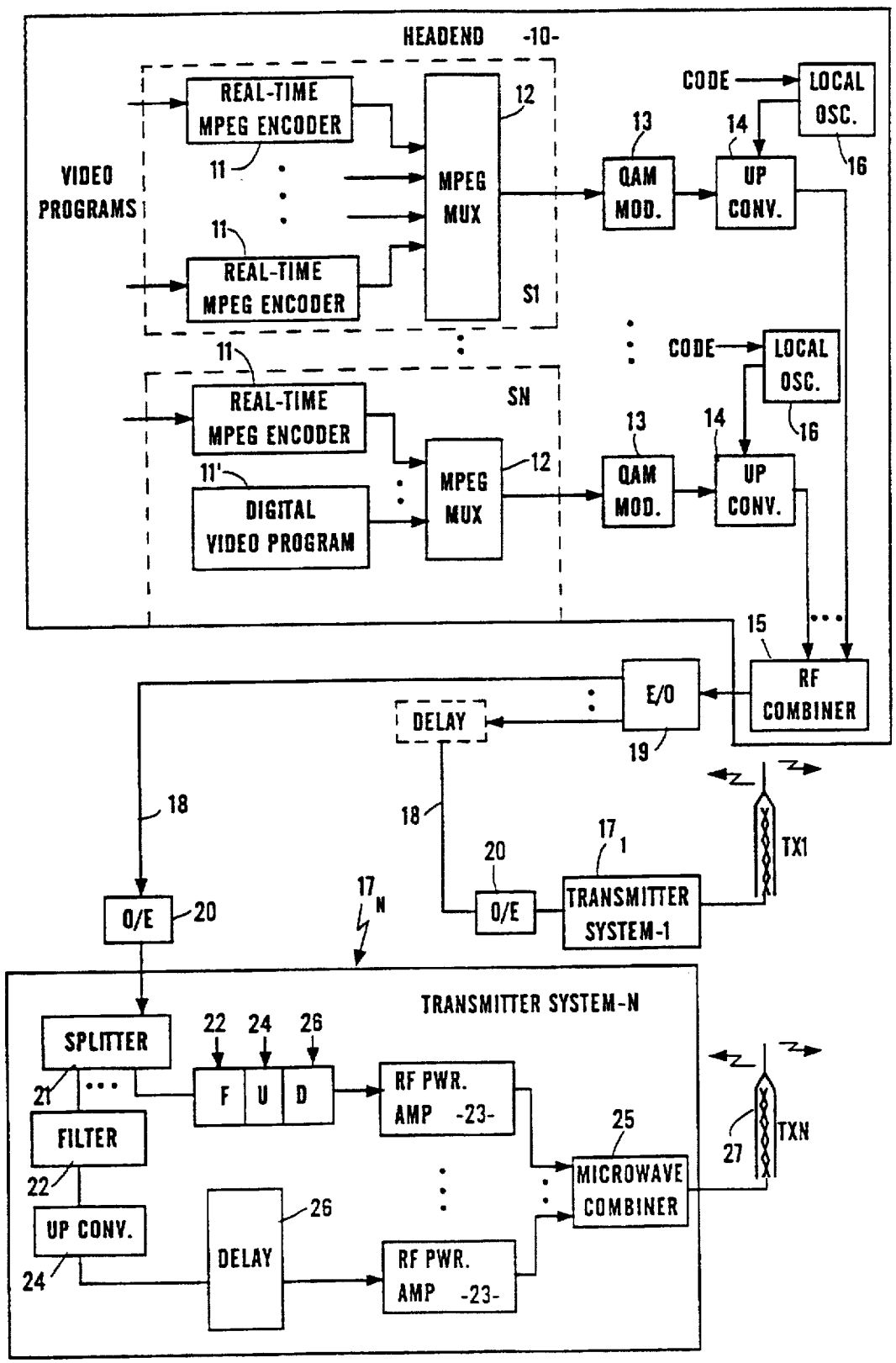
FIG. 6 depicts in functional block diagram form the elements of the transmission system which may be used in accord with the present invention.

With reference to FIG. 6, the broadcasting portion of the system includes a headend 10. The headend includes a number of Sources S1 to SN for producing digital transport streams, each of which contains a plurality of programs encoded as digital, compressed data. The number of such sources corresponds to the number of frequency channels available for use in a particular geographic region. To provide a commercially viable service, typically only 20–25 such channels are necessary. The headend 10 therefore may typically comprise 20–25 of the Sources S1 to SN, but may include additional sources. The Sources S1 to SN may convert analog program information from video sources, (e.g. off-the-air feeds, satellite receivers, VCRs, etc.) into compressed, digital data form. The headend 10 may also receive and process previously encoded material.

The video information, accompanying audio information and certain related data (if any) are encoded using a standardized digitization and compression technique, such as MPEG (moving pictures expert group) or DIGICIPHER™. The preferred embodiment utilizes MPEG 2 encoding. FIG. 6 illustrates the overall architecture of the broadcasting system. As part of the headend 10, that figure provides a simplified diagram of the source encoder functionality, e.g. at S1, for preparing a group of original analog source signals for transport through the network. As shown, each analog television signal, e.g. in NTSC format, is applied to an MPEG encoder 11. The encoder 11 digitizes both audio and video for a program, and packetizes the compressed digital data in accord with the appropriate standard. The encoder may also encrypt the data before insertion thereof into the transport packets.

MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax information from previous video frames as well as later video frames is used in formulating the prediction. "Delta" or "B" frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG 2 standard provides a standardized format for packetizing the compressed audio and video information and for transporting other data. Under the MPEG 2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mbits/s encoding system, a group of frames consisting of a total of 15 frames for one-half second of video (one I frame and a number of P and B frames), breaks down into 4000 transport packets.

Each 188 byte transport stream packet consists of two sections, a 4 byte packet header section, an optional adaptation field and a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program or source from which they originate.

Periodically, the transport packet for each program will also include a program reference clock (PRC) value within the optional adaptation field. In a typical 6 Mbits/s MPEG encoding system, the PRC is present in only 10 out of every 4000 video transport packets.

When included, the optional adaptation field includes a section for miscellaneous flags, such as discontinuity counter, private data flag, etc. One of the possible flags carried in this portion of the adaptation field is a program clock reference (PRC) flag. The adaptation field (AF) also includes a section designated for AF options. One of the options this section may carry is the PRC value.

On decompression, the decoder in sequence reconstructs the frames for a particular program from packets bearing the appropriate PID value, uses the reference frame to form the prediction frames, and then uses the prediction frames and delta information to construct full frames from the delta frames.

The MPEG 2 standard facilitates time division multiplexing of MPEG packets from a plurality of programs. In the present system, the encoders 11 supply MPEG packets streams for multiple programs to an MPEG multiplexer 12. The number of programs may vary depending on the bandwidth. The MPEG multiplexer 12 may receive digitized and compressed (MPEG) video from other sources 11'. Typical digital sources 11' include digital server (storage) systems and digital video transmission systems (e.g. satellite or optical fiber).

As discussed below, a typical multiplexed digital transport packet stream used in the present invention may have 27 Mbits/s of capacity. A mixture of program streams for individual programs at different individual rates, e.g. 1.5 Mbits/s, 3 Mbits/s and 6 Mbits/s, may be combined to fully utilize such a 27 Mbit/s capacity. In one example, the 27 Mbits/s multiplexed digital transport packet stream might consist of three 3 Mbits/s programs and three 6 Mbits/s programs. For simplicity of further discussion, however, assume encoding of programs at a 6 Mbits/s rate, therefore the multiplexer 12 combines four MPEG 2 packet streams of four such programs for output on each broadband rail.

In a typical example, there are at least three PID values for packets of a particular television type program encoded in MPEG 2 form, a first PID value for packets containing video, a second PID value for packets containing audio and another PID value for a packet containing a program map. There often are more than three PID's associated with the packets containing programming from one source. For example, there could be a data channel associated with the program which would include data for closed caprioting for the hearing impaired and/or related control signaling information. There could be a number of audio elementary streams, for example, carrying respective different languages. The program map, in turn, specifies the PID values for the various packets containing video, audio and/or data from the particular source.

In a combined MPEG packet stream carrying packets for two or more programs, the PID values for each program will be unique, and each such program is assigned a unique program number (PN). For example, HBO might have a program number '1', and the program map for HBO might be found in packets corresponding to PID 132. Showtime might have a program number of '2', and the program map for Showtime might be found in packets identified by PID 87 and so forth. The program map for HBO in the packet with PID 132 would then identify the PID numbers for the actual packetized elementary streams (PES) for the video, audio and data (if any) channels associated with the HBO program. The program map for Showtime in the packet with PID 87 would then identify the PID numbers for the actual packetized elementary streams (PES) for the video, audio and data (if any) channels associated with the Showtime program.

In the present embodiment, each multiplexer 12 outputs a group of MPEG encoded programs, i.e. four if the encoding rate of all encoders 11 is 6 Mbits/s, at a combined payload rate of 27 Mbits/s (it may be necessary to pad the steam with dummy packets to reach the full 27 Mbits/s). The MPEG 2 standard also requires that a packet stream containing packets relating to one or more programs includes a program association table in a packet identified by PID 0. The program association table maps each program number with the PID value associated with the program map related to that source. In accord with the standard, each MPEG 2 multiplexer 12 combines MPEG packet streams for the four (or more) input programs and adds a PID 0 packet containing the program association table to the combined stream. In the above example, the program association table would map program number '1' (HBO) with PID value 132 indicating that the program map for HBO is contained in repeating packets identified by PID 132. Similarly, the program association table would map program number 's' (Showtime) with PID value 87 indicating that the program map for Showtime is contained in repeating packets identified by PID 87.

As discussed in more detail below, reception of a particular digital program requires that the CPE terminal device know the spreading sequence transporting the program and the program number (PN) associated with the program. The decoder uses the information contained in the PID 0 packet to identify the PID value for the program map for the particular desired program, e.g. 132 in the above HBO example, and uses the program map to identify the PID values needed to capture the video, audio and user data (if any) for the desired program.

The 27 Mbits/s baseband digital output of each MPEG multiplexer 12 from one of the sources S1 to SN goes to a modulator 13. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six Mhz channel allocation for transmission over a cable television type distribution network. The currently preferred implementation uses 64 QAM (quadrature amplitude modulation) or 16 VSB (vestigial sideband) modulation techniques in the modulators 13. Using 64 QAM, 4 channels of 6 Mbits/s or a mix of 1.5, 3 and 6 Mbits/s encoded digital video information up to a total of 27 Mbits/s can be modulated into one 6 Mhz bandwidth analog channel. Similarly, 256 QPSK or 16 VSB would yield up to 40 Mbits/s of capacity, e.g. for 6 channels of 6 Mbits/s or mixes of the various rate encoded digital video information modulated into one 6 Mhz bandwidth signal to an individual spread spectrum up-converter 14. The up-converter converts the frequency of the QAM modulated signal up to a series of RF channel frequencies in the 50–450 MHz range pursuant to a code to be presently described.

In a spread spectrum system, a modulation technique is utilized in which a transmitted signal is spread over a wide frequency band within the communication channel. The frequency band is much wider than the minimum bandwidth required to transmit the information being sent. Generally, three types of spread spectrum communication techniques exist. These include:

Direct Sequence

The modulation of a carrier by a digital code sequence whose bit rate is much higher than the information signal bandwidth. Such systems are referred to as "direct sequence" modulated systems.

Hopping

Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Chirp

Pulse-FM or "chirp" modulation in which a carrier is swept over a wide band during a given pulse interval.

Information (i.e., the message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

Spread spectrum communication systems can be implemented as multiple access systems in a number of different ways. One type of multiple access spread spectrum system is a code division multiple access (CDMA) system. CDMA spread spectrum systems may use direct sequence (DS-CDMA) or frequency hopping (FH-CDMA) spectrum spreading techniques. FH-CDMA systems can further be divided into slow frequency hopping (SHF-CDMA) and fast frequency hopping (FFH-CDHA) systems. In SFH-CDMA systems, several data symbols representing a sequence of data bits to be transmitted modulate the carrier wave within a single hop; in FFH-CDMA systems, the carrier wave hops several times per data symbol.

In a SHF-CDMA system, multiple communication channels are accommodated by the assignment of portions of a broad frequency band to each particular channel. For example, a communication between two communication units in a particular communication channel is accomplished by using a frequency synthesizer to generate a carrier wave in a particular portion of a predetermined broad frequency band for a brief period of time. The frequency synthesizer uses an input spreading code to determine the particular frequency from within the set of frequencies in the broad frequency band at which to generate the carrier wave. Spreading codes are input to the frequency synthesizer by a spreading code generator. The spreading code generator is periodically clocked or stepped through different transitions which causes different or shifted spreading codes to be output to the frequency synthesizer. Therefore, as the spreading code generator is periodically clocked, the carrier wave is frequency hopped or reassigned to different portions of the frequency band. In addition to hopping, the carrier wave is modulated by data symbols representing a sequence of data bits to be transmitted. A common type of carrier wave modulation used in SFH-CDMA systems is M-ary frequency shift keying (MFSK), where $k=\log_2 M$ data symbols are used to determine which one of the M frequencies is to be transmitted.

Multiple communication channels are allocated by using a plurality of spreading codes. As a result, transmitted signals are in the same broad frequency band of the communication channel, but within unique portions of the broad frequency band assigned by the unique spreading codes. These unique spreading codes preferable are orthogonal to one another such that the cross-correlation between the spreading codes is approximately zero. Particular transmitted signals can be retrieved from the communication channel by despreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is enhanced while the other signals are not enhanced.

According to the preferred embodiment of the invention, frequency hopping spread spectrum is utilized. Referring to FIG. 6 the spread spectrum generator 14 is connected to or a local oscillator 16 which operates in a frequency range to achieve the desired degree of up-conversion. The frequency of the local oscillator is controlled by a code which establishes the frequency hopping path for each signal fed to the up-converter spread spectrum generator 15 by the modulator 13. It will be understood that each signal is provided with a unique code. Each code establishes a pseudo-random repetitive, periodic pattern which is known both to the spread spectrum generator or transmitter and to the spread spectrum receiver. As previously stated, these codes are synchronized according to known spread spectrum synchronization techniques. When the signal arriving at the receiver is correlated in its pseudo-random sequence to the signal from the transmitter, the result is the desired information. Because of multi-path delays and in the case of simulcasting the receiver may receive signals with many different time offsets. In order to cope with this the receiver is provided with one or more replicas offset by discrete amounts. When those delays match the delay offsets due to propagation, different signals coming in may be combined and added to provide an enhanced signal having a signal to noise ratio improved as compared to that of any single arriving signal. Also, it is not necessary that the multicast transmissions be synchronized. Any delays involved may be offset by adjustment of the above described offsets in the transmitting and receiving frequency hopping code time offsets or by fixed delay offsets which correspond to any delays which may be deliberately injected at the transmitting end.

The output of the spread spectrum processor/up-converter 14, 16 is fed to an RF combiner 15 for combining with the other RP signals from the other up-converter spread spectrum processors or transmitters 14. In a preferred embodiment this up-conversion is to an IF frequency in the 50–450 MHz band.

Each up-converter 14 outputs a different 6 MHz bandwidth channel to the combiner 15 for combining with the other 6 MHz signals from the other up-converters 14. The combiner 15 thereafter outputs the combined signals in the normal video channel range of approximately 50–450 MHz. The up-converters 14 and the combiner 15 may be the same as components currently used for RF signal processing in cable television systems.

A transmission network supplies the combined spectrum signal in the UHF range from the combiner 15 to a number of transmitter systems $17_1$ to $17_n$. Although coaxial cable, wireless microwave relay transmissions or other media could be used, in the preferred embodiment, the transmissions from the headend 10 ride on optical fiber lines 18. In the preferred embodiment, an electrical to optical converter system 19 converts the signal from combinet 15 into optical signals for transmission over a plurality of optical fibers 18. An optical to electrical unit 20 at each transmitter site converts the optical signal back to the combined electrical signal and supplies that signal to one of the transmitter systems.

According to one embodiment of the present invention the signals are simulcast, i.e., simultaneously broadcast from all of the transmitter towers TX1 to TXN. In such an embodiment an adjustment must be made to cope with the fact that the optical fiber signal transmission from the headend 10 to the transmitter systems requires some finite amount of time. Typically, the transmitter systems will not be equidistant from the headend. In fact, one of the transmitter systems may be in the same building as the headend. To insure simultaneous broadcasting according to this embodiment, the system shown in FIG. 6 includes some form of delay 19 in one or more of the transport lines 18. The delay may take the form of coils of fiber to equalize the optical transport paths and therefore the time through each path. Alternatively, one or more electronic delay devices may be imposed in the relevant paths, either at the headend prior to optical transport or at the respective transmitter location subsequent to conversion back to electrical signal form. According to another embodiment the foregoing delays need not be equalized but may be compensated by corresponding adjustment of the delays introduced at the receiving end. Indeed, in certain instances it may be desired to deliberately introduce delays among antennas at the transmitting end with corresponding compensation at the receiving end.

There may be as few as two transmitters per cell. In a typical example, there will be three transmitter sites about the periphery of each cell as shown in FIG. 5. The headend may be close to the center of the cell array and, therefore the transport distance to interior cell antenna sites would be the shortest. Assume now, for example, that antenna site 614 is the longest distance from the headend. The delay produced by delay device 19 will be equal to the difference in the time required to transport optical signals from the headend to the two sites having the shortest and longest spacing so as to result in simultaneous in-phase transmission of the exact same signal from the antennas at the two transmitters. Similar delays are imposed in the lines 18 to the other transmitter systems.

FIG. 6 also shows details of one of the transmitter systems 17N, by way of an example. Each transmitter system includes a splitter 21. The splitter 21 together with associated channel selection filters 22 divide the received combined signal (50–450 MHz) into its constituent 6 MHz wide RF channels. For each 6 MHz channel in the 50–450 MHz range, one of the up-converters 24 converts that channel into one of the up to thirty-three available (licensed) channels in the UHF microwave range. An RF power amplifier 23 amplifies each UHF channel.

A delay device may process each channel signal, and by way of example, FIG. 6 shows a delay device 26 processing the output of each of the up-converters The delay devices 26 provide precise delay compensation on each respective channel to compensate between variations in throughput processing time of the various components at different transmitter sites operating on the signal to be broadcast on a particular microwave channel. The delay devices may also be utilized to inject delays to deliberately introduce known delays in the signals broadcast from the various antennas as previously described.

Figure 6A:
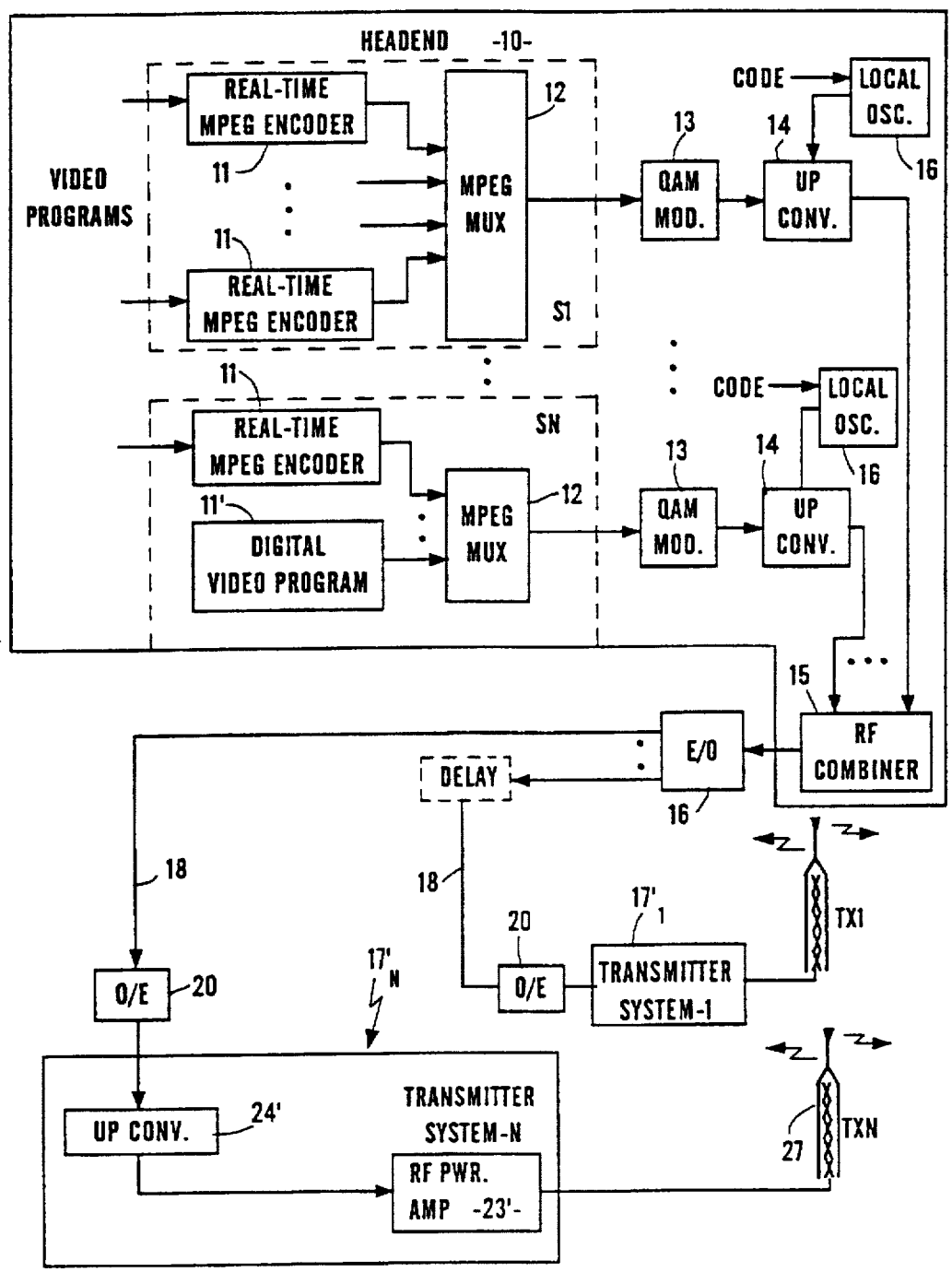
FIG. 6A depicts a modification of the elements of presented in FIG. 6.

A microwave combiner 25 combines the UHF channel signals back into a combined spectrum signal in the UHF range and supplies that signal to a microwave broadcasting antenna 27. Each transmitting antenna is directional into the cell, as described, or may be omni-directional as described with respect to the antenna 622 in FIG. 5A. The type of antenna at each transmitter site is selected to give the optimum coverage in a particular geographic service area. The antenna 27 emits UHF waves to propagate through a portion of the service area. According to one embodiment, the resultant broadcasts from all of the transmitters are synchronized and in phase with each other. The transmitted microwave signals propagate into substantially overlapping portions of each cell in the service area and into some non-overlapping portions of that area, for example in patterns such as shown in FIGS. 5 and 5A. As an alternative to the transmitter system shown in FIG. 6 it is possible and at times advantageous to use a simplified arrangement such as shown at 17'N in FIG. 6A. According to this embodiment of the invention the combined received signal (50–450 MHz) is fed to a block upconverter 24' and thence to a single wideband linear power amplifier 23' from which the signal to be transmitted is connected to the antenna 27.

Figure 7:
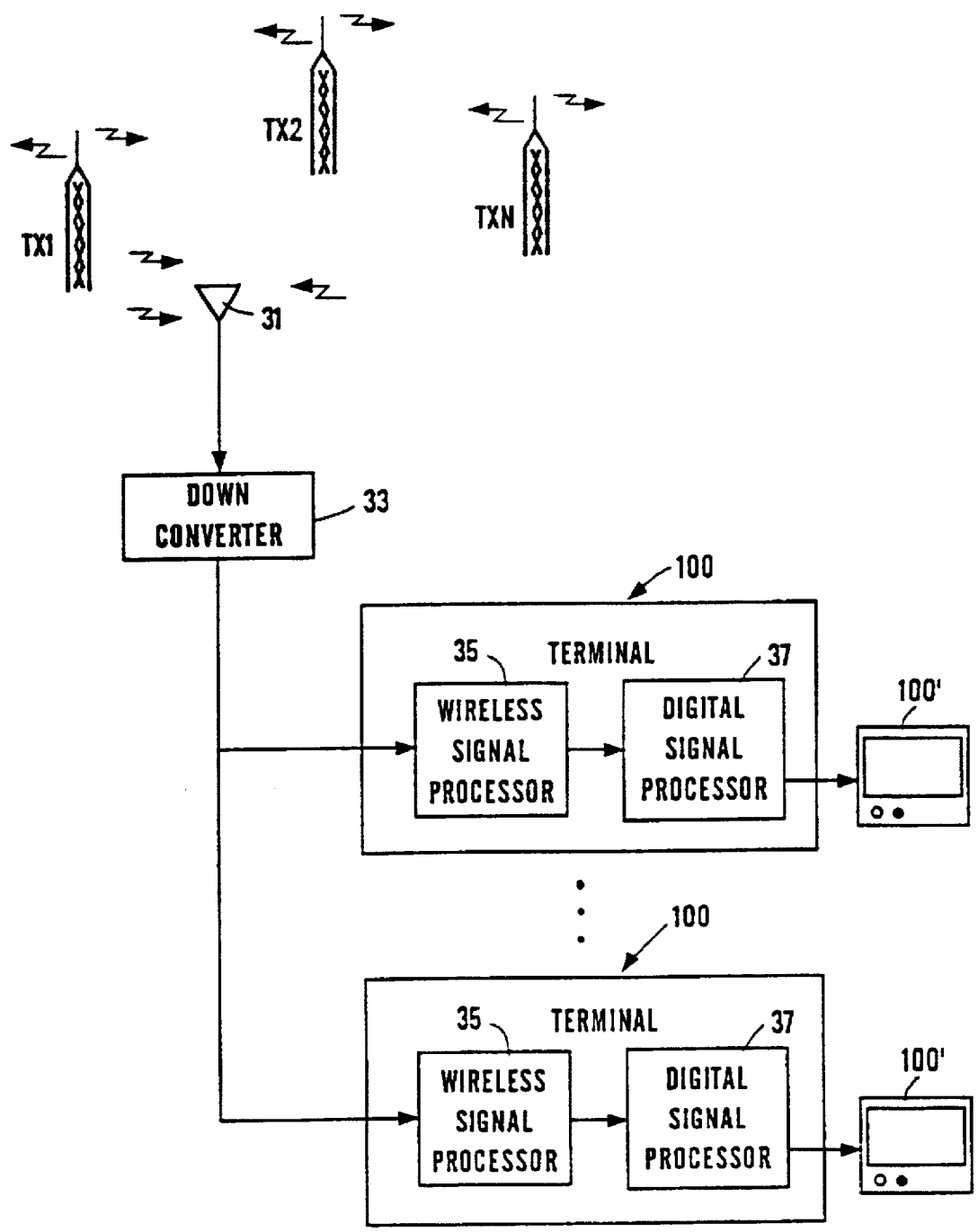
FIG. 7 illustrates the functional elements of a customer premises receiver system used in accord with the present invention.

FIG. 7 provides a high-level functional diagram of a receiving system at one subscriber's premises. Each subscriber has a receiving antenna 31. In accord with the preferred embodiment, the receiving antenna 31 is a gain antenna having an omni-directional azimuth pattern, such as a discone antenna, a whip antenna, or the like.

The receiving antenna 31 supplies the 2.6 GHz spectrum (through appropriate filtering not shown) to a block down-converter 33. The block down-converter converts the 2.6 GHZ signal, containing all of the RF channels, back down to the video channel band of 50–450 MHz. The block down-converter supplies the 50–450 MHz combined spectrum signal via a coaxial cable to one or more terminal devices 100 located am various places in the subscriber's home. Each terminal 100 includes some form of wireless signal processor 35 for processing a selected one of the 50–450 MHz channels to recover the digitally multiplexed transport stream carried in that channel. Each terminal connects to an associated television set 100'. The digital signal processor 37 processes data packets for the selected program from the multiplexed stream to produce signals to drive the TV 100'. The TV '100' presents the program to the viewer in sensorially perceptible form, in this case, as a standard audio/visual output.

Figure 8:
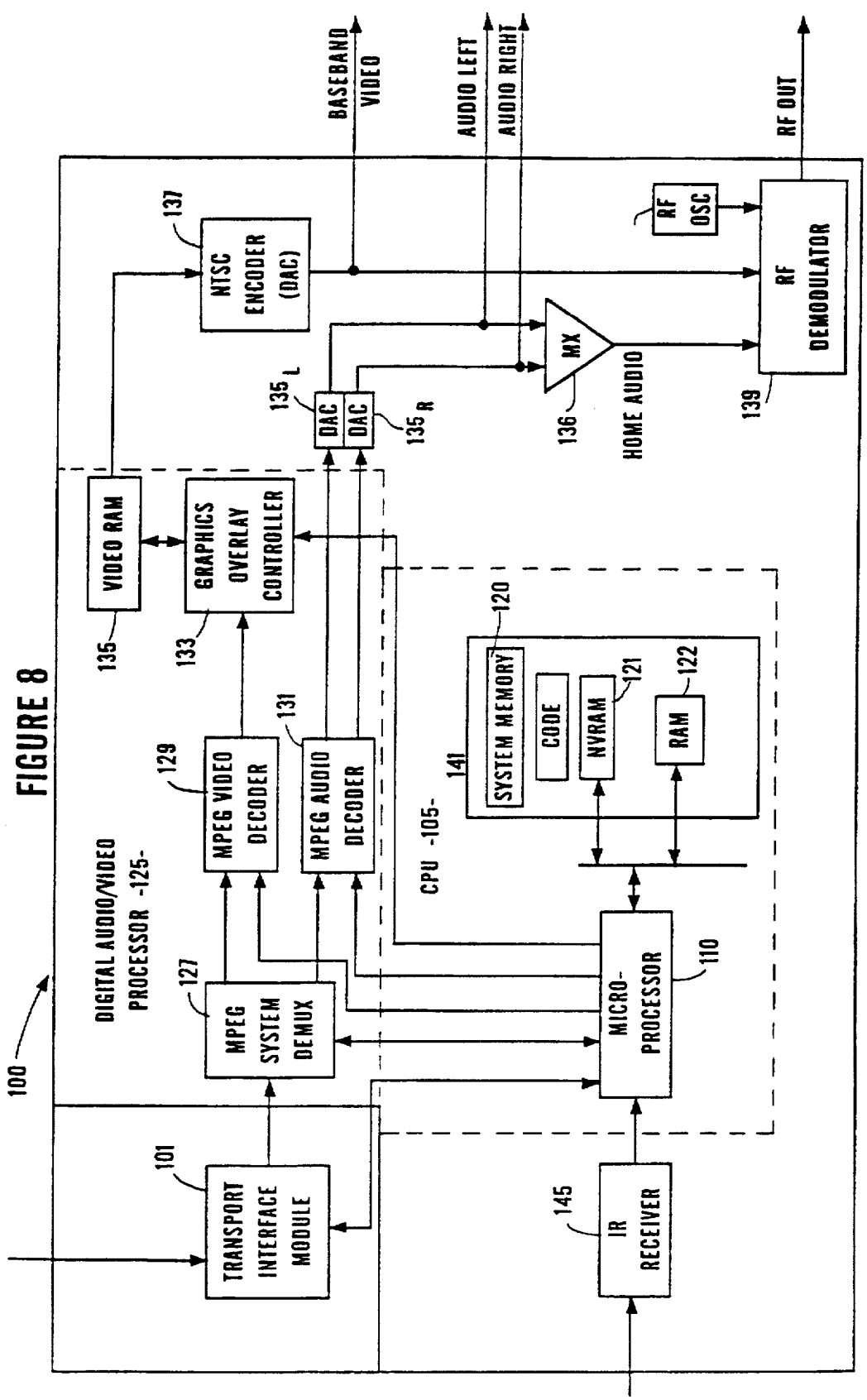
FIG. 8 illustrates in block diagram form the elements of one terminal device used in the system of FIG. 7.

FIG. 8 illustrates the functional elements of the terminal 100. In this embodiment the terminal 100 is a digital entertainment terminal, or 'DET.' The DET 100 will include a transport interface module (TIM) 101 providing the actual physical connection to the coaxial cable network in the subscriber's premises. The transport interface module (TIM) 101 will also perform the format conversion necessary between signal formats utilized by the network and signal formats used within digital processing portion of the DET 100. In the present invention, the TIM performs the frequency hopping despreading and QAM demodulation. If the programming is encrypted, the TIM also includes the necessary decryption circuitry. The TIM 101 therefore serves as the wireless signal processor 35. The main portion of the DET 100 serves as the digital signal processor 37.

In the illustrated embodiment, the transport interface module (TIM) 101 presents two connections to the rest of the DET, a high bit rate broadband connection for received broadband signals and a low bit rate signaling connection to permit control and monitoring of the TIM by a microprocessor within the main portion of the DET. For a selected channel, the TIM hands off the 27 Mbits/s baseband digital transport stream captured from that RF channel to the main portion of the DET. The structure of the TIM 101 is described in more detail below with regard to FIG. 9.

The DET 100 includes a CPU 105, comprising a 386, 486 or Pentium microprocessor 110 and associated system memory 120. The system memory 120 includes at least 2 mbytes of volatile dynamic RAM 122 and 1 mbyte of non-volatile 121. The microprocessor 110 includes a small amount of ROM (not shown) storing "loader" programming needed to control wake-up and EPROM memory (not shown). The ROM memory includes a wake-up frequency hopping code sequence which is effective to initiate downloading of the appropriate despreading code table into the memory 120 if that table is not then resident there.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. mbytes) of video RAM 135.

The MPEG system demultiplexer circuitry 121 recognizes packets in the MPEG data stream received over the broadband channel through the transport interface module (TIM) 101 and routes the packets having predetermined PID values to the appropriate components of the DET. For example, under CPU control, the MPEG system demultiplexer 127 circuitry recognizes audio and video packets in the MPEG data stream as audio and video relating to a selected program and routes those packets to the decoders 129, 131, respectively. The MPEG system demultiplexer circuitry 127 route packets having specified PID values identified as user data packets to the CPU 105 for further processing. The MPEG system demultiplexer circuitry 127 recognizes program map packets (and program association packets if necessary) and supplies those packets to the CPU 105.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video tiecoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as the initial turn-on selection menu received over the signaling channel, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video fame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overlay controller 133. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 100 includes audio digital to analog converters (DAC's) $135_L$, $135_R$, an audio mixer 136, an NTSC encoder 137, and an RF modulator 139.

The DAC's $135_L$ and $135_R$ receive the uncompressed left and right digitized audio signals output by the MPEG audio decoder 131. In response, the DAC's $135_L$ and $135_R$ produce baseband analog audio signals for output to individual baseband output terminals. The audio mixer 136 also receives the baseband audio signals from the DAC's $135_L$ and $135_R$. The mixer 136 combines the left and right analog audio signals to produce a monaural audio signal as the audio input to modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 100. The baseband NTSC video signal is also supplied to the RF modulator 139. The RF modulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user. In the embodiment illustrated in FIG. 1, the DET 100 includes an infrared (IR) receiver 145. The (IR) receiver 145 responds to inputs signals from a user operated IR remote control device (not shown) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on applications programming and/or operating system software scored in the system memory 120. For example, in response to certain input commands, the microprocessor 110 may control a cursor position and display received user data in the form of alphanumeric information displayed as graphics and text on the associated television set 100'. The microprocessor 110 will also respond to an appropriate input command from the user to select a broadcast program as discussed in more detail below.

Figure 9:
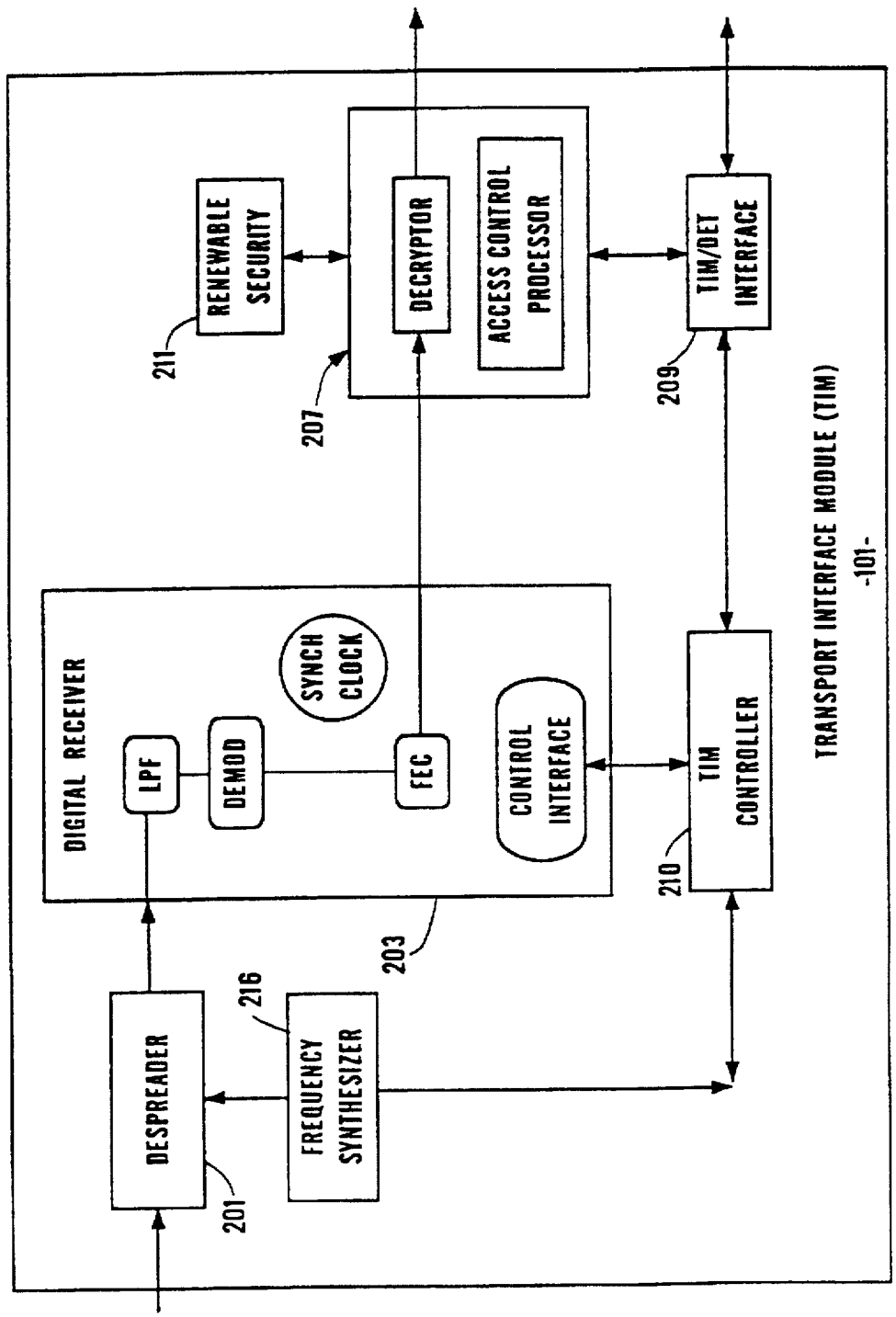
FIG. 9 is a block diagram illustration of the elements of a transport interface module used in the terminal of FIG. 8.

FIG. 9 depicts in block diagram form the structure of a TIM 101. The structure illustrated is based in part on the current preference for the 64 QAM modulation techniques for the digital video signals in transmission system of the type shown in FIG. 6. The input to the TIM is a spread spectrum signal in the 50–450 MHz range provided from a coaxial cable from the down converter. The despreader 201 selects a specific 6 MHz channel from the broadband input spectrum under control of the frequency synthesizer 216 and presents it at an intermediate frequency to the digital communications receiver section 203.

The digital receiver 203 includes a low-pass filter, a demodulator (e.g., 64 QAM), and forward error correction circuitry. A clock circuit provides synchronization for the digital output of the demodulator, despreader, and the forward error correction circuitry.

A control interface provides appropriate control signals to the elements of the digital receiver 207 in response to instructions from the transport interface module (TIM) controller 210. The digital receiver processes signals selected from one of the RF channels by operation of the tuner 210 to capture one of the digital transport streams (e.g. 27 Mbits/s payload assuming 64 QAM). The digital processor outputs the transport stream as a corrected serial baseband digital feed.

A decryption module 207 is optional. If included, this module controls access to digital broadcast services. The decryption module 207 comprises a decryptor and an interface to a renewable security device 211. The renewable security device 211 may be a card reader for accepting a TV Pass Card. An access control processor within the decryption module 207 controls the operation of the decryptor. When properly authorized, the decryptor in module 207 decrypts payload data within packets of a selected program in the transport stream. The composite MPEG transport multiplex with appropriately decrypted components for the selected program is output from the TIM 101 to the host DET's demultiplexer 127 and decompression circuitry as shown in detail in FIG. 8. The TIM controller 210 and/or the decryption module 207 receive instructions from the CPU 105 (FIG. 8) as to channel and program selections via the TIM/DET interface 209.

The system memory 120 of the main portion of the DET 100 will store a channel map for the digital broadcast programs available through the system. For each program service, the map includes information defining a logical network channel number for the program. The logical channel number is the channel the DET will display on a front panel display (not shown) or on the screen of the associated television set 100' and is the number that the user inputs via the remote control to select the program. For each program, the map also includes RF channel information needed to mute to the RF channel carrying the program and the program number (PN) uniquely identifying the program within the multiplexed digital transport stream.

When the user selects a digital broadcast program, the microprocessor 110 in the main portion of the DET accesses the listing for that channel in the channel map and the despreading code table stored in the system memory 120. The microprocessor 110 supplies a message containing the RF channel number and the frequency hopping code to the TIM controller 210 via interface 209. In response to the RF channel number, the TIM controller 210 activates the frequency synthesizer 212 to synchronize the frequency hopping code fed from the memory 120 through the microprocessor to the frequency synthesizer. The frequency synthesizer feeds the code to the despreader 201 which in turn delivers the selected channel to the LPF in the digital receiver 203. If the program is encrypted, the TIM uses the program number, the program association table in the packet identified by PID 0 and the program map to identify the packets carrying audio, video and data (if any) for the program. If authorized to receive the program as indicated via the renewable security device 211, the decryption module 207 uses a decryption key from its memory or from the renewable security device 211 to descramble the information in the payloads of the packets of the selected program. As a result, the TIM 216 passes digital signals from the RF channel through the interface to the MPEG system demultiplexer 129 in the main portion of the DET wherein at least the information for the selected program is now in unencrypted form.

The MPEG demultiplexer 127 supplies information from the PID 0 packet, i.e. the program association table to the CPU 105. The microprocessor 110 uses the program number (PN) from the channel map stored in system memory 120 to identify the PID value for the correct program map from the program association table. The CPU 105 supplies that PID value to the MPEG demultiplexer 127. When the MPEG demultiplexer 127 receives a packet containing that PID, it supplies information from the packet identified by the PID (the program map) to the CPU. From the program map, the CPU identifies the PID values for the video and audio for the program and instructs the demultiplexer 127 to supply those packets to the respective MPEG decoders 129, 131 to begin MPEG decoding of the selected program for presentation to the user via the associated television set 100'.

Figure 10:
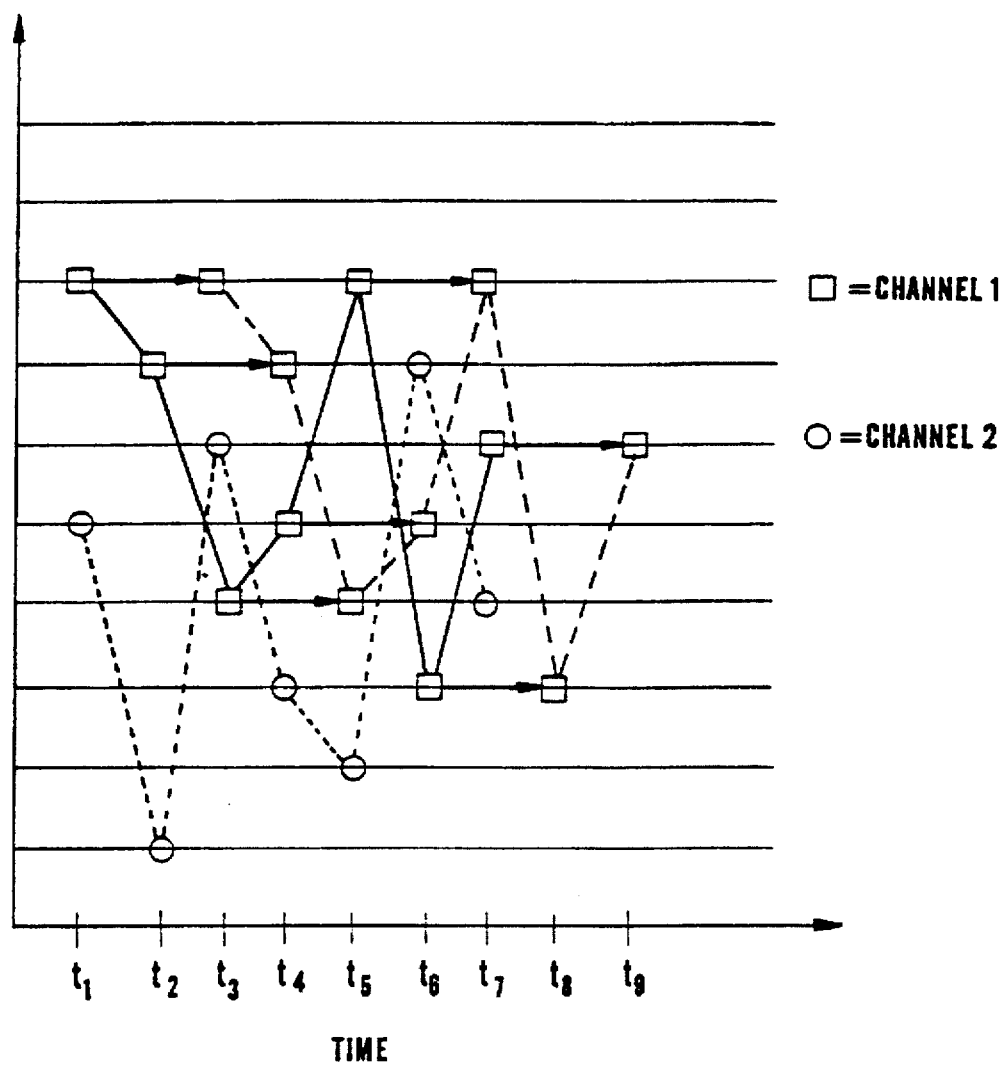
FIG. 10 illustrates in graphical form the operation of the receiver in using multi-path time delayed signals to advantage.

Referring to FIG. 10 there is shown in simplified graphical form spread spectrum transmitted signals and the operation of the spread spectrum receiver and rake processor in differentiating between the signals of different channels and enhancement of the selected and tuned signal by capture and processed summation of a multi-path signal. This receiver and processor also preferably performs frequency up-converting. Frequency is plotted on the vertical scale and time on the horizontal scale in increments of small $t_1$–$t_9$. The squares represent the frequency of the Channel 1 carrier which is frequency hopped signal pursuant to the hopping code to which it is assigned. The circles represent the frequency hopped signal of Channel 2 hopping frequencies pursuant to the different hopping code to which it is assigned. Each channel represents four multiplexed NTSC signals frequency hopped by the operation of the local oscillator in FIG. 6 and then summed, up-converted and transmitted in the 2.6 GHz range from the multiple transmitter sites illustrated in FIG. 7. Channel 2 represents a similar signal from frequency hopping created by a second local oscillator pursuant to a different code and therefore follows a different pattern than the first channel.

Figure 11:
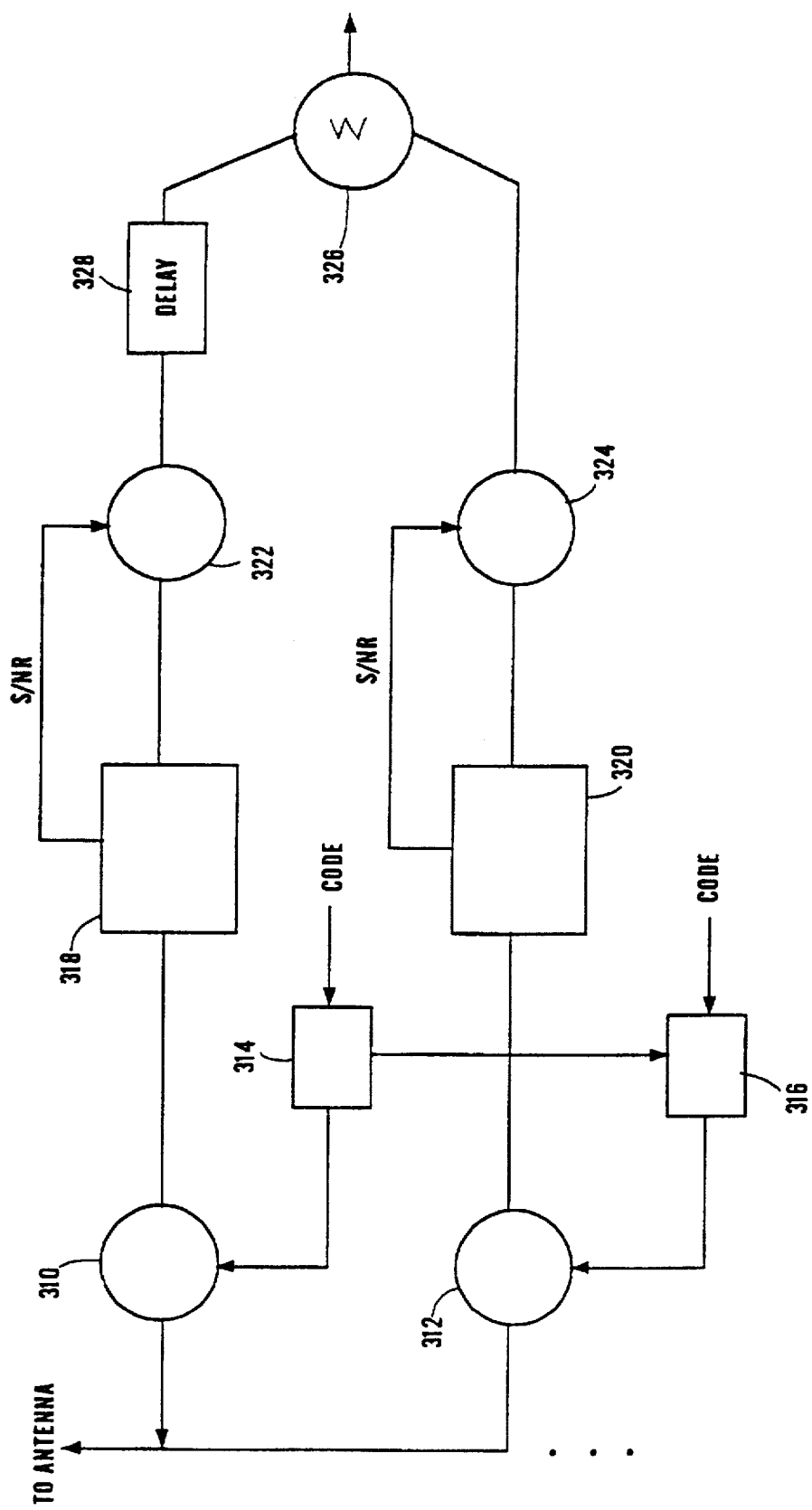
FIG. 11 depicts details of the despreader in FIG. 9.

When the tuner in the receiver is tuned to receive Channel 1 through operation of the TIM controller 210 its synthesizer executes the same frequency hopping pattern as the first local oscillator and is synchronized with that oscillator in a known manner. As a result, that spread spectrum receiver outputs a faithful reproduction of Channel 1. Assuming that the transmitted signal representing Channel 1 is encountering a 2 microsecond delay a duplicate pattern is created which lags the primary pattern by 2 microseconds as shown by the squares connected by dashed lines in FIG. 10. In order to obtain an advantage from the multi-path signals this signal is utilized by the synthesizer in the spread spectrum receiver running the Channel 1 sequence or code twice with the second occurrence offset by the t1–t3 delay. For simplicity purposes, this effect is illustrated in FIG. 11 by showing a pair of synthesizers 310 and 312 locked by local oscillators 314 and 316 offset by 2 microseconds, while executing the Channel 1 frequency hopping sequence. The outputs of the synthesizers 310 and 312 in FIG. 11 are fed to band pass filter processors 318 and 320. These modules not only limit the pass band but also gauge the signal to noise ratio and feed signals representative of that ratio to processors 322 and 324. Any frequency which has not suffered the same 2 microsecond delay will appear outside of the pass band. The signal through the upper circuit in FIG. 11 has zero delay, while the signal through the lower circuit has the 2 microsecond delay. The processors 322 and 324 determine the signal to noise ratios which are used to weight the receiver signal, and they are summed in the summer 315. Alternatively, the processors 322 and 324 may determine the strongest of the received signals and provide this signal as an output in a filtered and amplified form, if desired. In a summing mode in view of the fact that there is a 2 microsecond delay in the circuit a 2 microsecond delay is provided at 328 in the upper circuit. As a result the summer in effect increases the signal obtainable from either of the two single signals.

It will be understood that multi-path delays other than the 2 microsecond delay will be encountered in practice. The dots in FIG. 11 indicate additional synthesizers that will be used at different delay offsets so that virtually all usable multi-path delayed signals may be captured and utilized by duplication of the illustrated lower synthesizer, band pass and processor. The output of the summer 326 is fed to the digital receiver 203 in FIG. 9.

Figure 12:
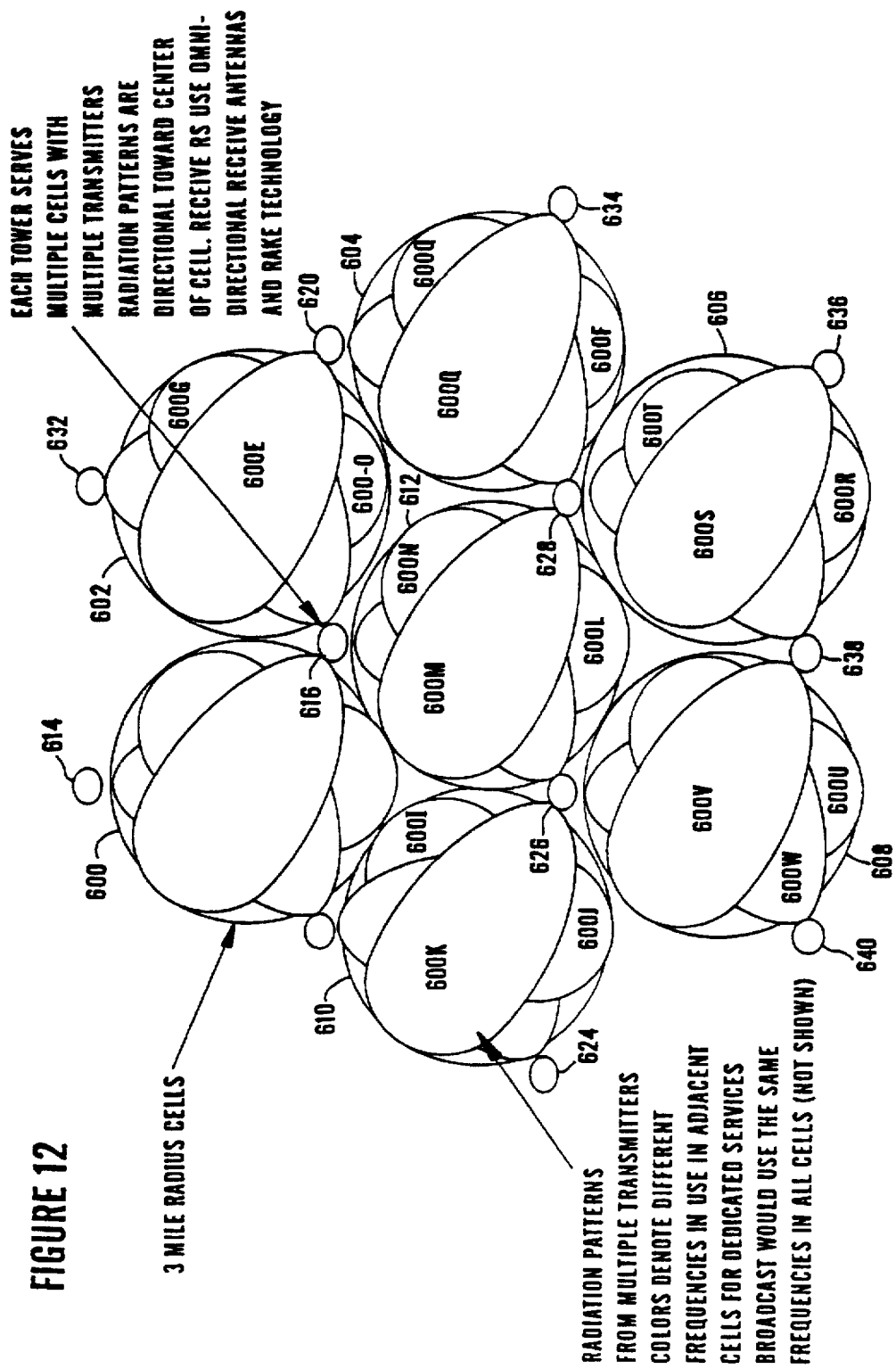
FIG. 12 depicts an array of cells, antenna sites, and propagation lobes which may be utilized with a dedicated service embodiment of the present invention.

Referring to FIG. 12 there is shown an illustration of an array of cells and antennas for implementing dedicated services. In the illustrated cell array the antenna sites associated with cell 600, namely antenna sites 614, 616 and 618 have antennas transmitting lobes 600A, 600B and 600C into cell 600 at a first frequency. The antenna site 618 which is associated with adjacent cells 600 and 610 also has an antenna transmitting a lobe 600D into cell 610 at a second frequency. Antenna site 624 has an antenna transmitting lobe 600I into cell 610 at the second frequency as does an antenna 626, which transmits lobe 600K into cell 600 at the second frequency. The central cell 612 has associated therewith antenna sites 616, 628 and 630 which transmit into that cell lobes 600L, 600M and 600N at a third frequency. The antenna sites associated with lobe 602, which is adjacent lobe 600, has associated antenna sites 616, 620 and 632. These antenna sites have antennas which transmit into cell 602 lobes 600E, 600G and 600O at the second frequency, which is the same frequency used in cell 610. Because of the spacing between the cells 602 and 610 there is no interference between the signals transmitted into these cells thereby permitting frequency reuse. Cell 604 has associated therewith antenna sites 620, 634 and 636. These sites have antennas which transmit into cell 604 lobes 600F, 600G and 600Q at the first frequency. This is the same frequency used at spaced cell 600. Cell 606 has associated antenna sites 628, 636 and 638. These antenna sites have antennas which transmit into cell 606 lobes 600R, 600S and 600T at the second frequency. This is the same as the frequency utilized in cells 602 and 610. Cell 608 has associated antennas 626, 638 and 640 which transmit into the cell 608 lobes 600U and 600W. These lobes are transmitted at the first frequency. This frequency is the same as that utilized in spaced cells 600 and 604.

With the system of FIG. 12 it is possible to provide video-on-demand and other interactive services utilizing the public switched telephone network in a manner shown, by way of example, in U.S. Pat. Nos. 4,995,078, issued Feb. 19, 1991; 4,890,320, issued Dec. 26, 1989; 4,506,387 issued Mar. 19, 1985; 4,792,849, issued Dec. 20, 1988; or as described in the article "Advanced Video Response System," by Hirohito Nakajima in the July 1979 issue of Japan Telecommunications Review.

Referring to FIG. 13 there is illustrated a feature of the invention which permits minimization of interference with the delivered signal by atmospheric occurrences such as rain, snow, fog or the like. Each antenna site 614–636 is provided with a signal strength sensor (not shown) of conventional construction which detects the presence and severity of signal attenuation at the sensor size. These sensors are connected through suitable links illustrated, by way of example, by connections generally shown at 700 to a trunk 702 which connects the individual links to an analyzer and controller 704. The analyzer and controller 704 comprises a suitable processor which reacts to the inputs from the sensors to determine which cells and which transmitter sites and antennas are affected. Based upon this analysis the analyzer and controller originates control signals over link 706 to the various RF power amplifiers 23 in the transmitter systems $17_1$–$17_N$ shown in FIG. 6. The control signal varies the output of the RF power amplifiers to increase that output being delivered to the appropriate antennas to increase the power being delivered into the area affected by the rain. While a single analyzer and controller is illustrated it will be appreciated that the control function may be distributed and effected at the various antenna sites. It is a feature of the invention that this power increase may be obtained by transfer of power to the affected area from unaffected areas by reducing power input to the antenna or antennas that serve the unaffected areas. It will be appreciated than the links collectively indicated at 700 may be of any suitable type, such as wire, cable, fiber, or microwave. This feature of the invention aids in permitting use of higher frequency spectrum than would otherwise be effective to deliver reliable service.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A system comprising:

a plurality of groups of spaced transmitting antennas disposed substantially on the peripheries of adjacent cells within a service area;

each of said transmitting antennas being directional and directed to propagate substantially simulcast broadband signals in a first directional pattern into at least the cell bounded by the periphery with which the antenna is associated;

the propagation patterns of the transmitting antennas of a cell with whose periphery they are associated being of a shape and extent so as to overlap over substantially a major portion of the area enclosed within said periphery;

plural receivers in each of multiple cells receiving multiple time separated versions of said broadband signals and having a signal processing device processing said versions of said broadband signals to provide a substantially single output signal; and display devices connected to receive said substantially single output signal and provide a sensorially perceptible display corresponding to at least a portion of said substantially single output signal.

2. A system according to claim 1 wherein antennas disposed substantially on the peripheries of adjacent cells propagate signals into each of said adjacent cells in said directional patterns.

3. A system according to claim 2 wherein antennas disposed substantially on %he peripheries of three adjacent cells propagate signals into each of said three adjacent cells in said directional patterns.

4. A system according to claim 1 wherein said transmitted broadband signals are transmitted as spread spectrum signals and said receiver signal processing devices comprise despreaders and Rake processing devices.

5. A system according to claim 1 wherein said transmitted broadband signals are transmitted as frequency hopping spread spectrum signals and said receiver signal processing devices comprise despreaders and Rake processing devices.

6. A system according to claim 1 wherein said transmitted broadband signals are digitally modulated and are transmitted as frequency hopping spread spectrum signals and said receiver signal processing devices comprise despreaders and Rake processing devices.

7. A system according to claim 1 wherein said transmitted broadband signals are digitally modulated and are transmitted as frequency hopping spread spectrum signals and said receiver signal processing devices comprise despreaders and Rake processing devices.

8. A system according to claim 1 wherein said transmitted broadband signals include multiplexed channels each including multiplexed streams of digital broadband data.

9. A system according to claim 8 wherein said receivers include a demultiplexer, a decoder, and a demodulator.

10. A system according to claim 1 wherein said transmitted broadband signals include multiplexed channels each including multiplexed streams of digitally modulated digital broadband data transmitted as frequency hopping spread spectrum signals and said receiver signal processing devices comprise despreaders, Rake processing devices, demultiplexers, decoders, and demodulators.

11. A system according to claim 1 wherein the broadband signals transmitted by said antennas are simulcast.

12. A system according to claim 1 wherein said plural receivers are disposed in the overlap portions of the areas within said cells.

13. A system according to claim 1 wherein said antennas each transmit the broadband signal on the same frequency into adjacent cells.

14. A system according to claim 1 including signal strength sensors associated with at least certain of said cells, a transmitter connected to deliver a signal to be transmitted to at least one antenna associated with a cell having a sensor associated therewith, and said transmitter being responsive to a signal from a sensor indicating a decrease in signal strength to increase the power output of said transmitter to said at least one antenna associated with the sensor sensing the occurrence decrease in signal strength.

15. A system according to claim 2 wherein the broadband signals propagated into adjacent cells are at different frequencies.

16. A system according to claim 15 including a headend providing a source of different broadband signals subject to selection, customer premises where at least certain of said receivers are located, each customer premise where said certain receivers are located having a signaling device, at least a virtual link between said signaling devices and said headend communicating to the headend the identity broadband signal selected by a customer with a signaling device, said headend responsive to a communication identifying a selection delivering the selected broadband signal to at least one antenna transmitting a signal to the receiver located on the premise of said customer.

17. A system according to claim 16 wherein said link is established at least partially over the public switched telephone network.

18. A system for distributing broadband program data to a service area comprising:

a plurality of groups of spaced transmitting antennas disposed substantially on the peripheries of adjacent cells within said service area;

each of said transmitting antennas being directional and directed to propagate substantially simulcast frequency hopping signals, each carrying the broadband program data, in a first directional pattern into the cell bounded by the periphery with which the antenna is associated and in a second directional pattern into an adjacent cell;

the propagation patterns of the transmitting antennas of a cell with whose periphery they are associated being of a shape and extent so as to overlap over substantially a major portion of the area enclosed within said periphery;

plural receivers in each of multiple cells receiving multiple time separated versions of said frequency hopping signals and having a despreader and Rake processing device processing said versions of said signals to provide a substantially single output signal carrying said broadband program data from each such receiver; and display devices connected to receive said substantially single output signal and provide a sensorially perceptible display corresponding to at least a portion of said substantially single output signal.

19. A system according to claim 18 wherein said frequency hopping signals include multiplexed channels each including digitally multiplexed streams of said digital broadband program data, and wherein said receivers include a digital demultiplexer, a decoder, and a demodulator.

20. A system according to claim 19 wherein frequency hopping signals transmitted into adjacent cells are at the same frequency.

21. A system according to claim 19 wherein frequency hopping signals transmitted into adjacent cells are at different frequencies.

22. A system according to claim 19 including signal strength sensors associated with at least certain of said cells, a transmitter connected to deliver a signal to be transmitted to at least one antenna associated with a cell having a signal strength sensor associated therewith, and said transmitter being responsive to a signal from a signal strength sensor indicating a decrease in signal strength to increase the power output of said transmitter to said at least one antenna associated with the signal strength sensor sensing the signal strength decrease.

23. A system according to claim 19 including a headend providing a source of different broadband program data subject to selection, customer premises where at least certain of said receivers are located, each customer premise where said certain receivers are located having a signaling device, at least a virtual link between said signaling devices and said headend communicating to the headend the identity of one of the different broadband program data selected by a customer with a signaling device, said headend responsive to a communication identifying a selection delivering the selected broadband program data to at least one antenna transmitting a signal to the receiver located on the premise of said customer.

24. A system according to claim 23 wherein said link is established at least partially over the public switched telephone network.

25. In a cellular system for distributing a wireless signal to a service area the method comprising the steps of:
a) substantially simulcasting into cells in said service area from plural transmitting antennas disposed substantially on the periphery of the cells directional signals directed from the antennas disposed on the periphery of a cell into said cell so that the propagation patterns of said antennas in said cell overlap over substantially a major portion of the area of said cell;
b) transmitting said directional signals from said antennas into said cells as spread spectrum signals carrying broadband information;
c) receiving said spread spectrum signals at plural receivers located in at least one of said cells in the area of overlap of said propagation patterns including receiving a time delayed version of one of the spread spectrum signals;
d) processing at least a portion of the received signals to acquire a single copy thereof; and
e) presenting the broadband information contained in the acquired signal to a user in sensorially perceptible form.

26. A method according to claim 25 including the step of transmitting from antennas substantially on the peripheries of adjacent cells in plural directional patterns into said adjacent cells.

27. A method according to claim 26 including the steps of receiving said spread spectrum signals at plural receivers located in each of said adjacent cells in the area of overlap of said propagation patterns in said cells.

28. A method according to claim 27 wherein said signals are transmitted into said spread spectrum adjacent cells at the same frequency.

29. A method according to claim 27 wherein said signals are transmitted into said spread spectrum adjacent cells at different frequencies.

30. A method according to claim 25 including the steps of:
transmitting said spread spectrum signals as frequency hopped spread spectrum signals; and
processing the received signals with Rake processing techniques.

31. A method according to claim 30 including the step of transmitting from antennas substantially on the peripheries of adjacent cells in plural directional patterns into said adjacent cells.

32. A method according to claim 31 including the steps of receiving said spread spectrum signals at plural receivers located in each of said adjacent cells in the area of overlap of said propagation patterns in said cells.

33. A method according to claim 32 wherein said spread spectrum signals are transmitted into said adjacent cells at the same frequency.

34. A method according to claim 33 wherein said spread spectrum signals are transmitted into said adjacent cells at different frequencies.

35. A method according to claim 25 including the steps of:
sensing rain substantially at a transmitting antenna; and
increasing the power transmitted by said antenna.

36. A method according to claim 25 including the step of transmitting into plural cells from a substantially omnidirectional antenna the same signals as are transmitted into said cells by said directional antennas.

37. A method according to claim 25 wherein said spread spectrum signals transmitted from said transmitting antennas include frequency multiplexed channels each including multiplexed streams of digital data in digitally compressed form.

38. A method according to claim 37 including the steps of selecting with at least one of said receivers one of said frequency multiplexed channels and from the compressed multiplexed stream of digital data in that channel selecting one set of said digital data; and displaying said data.

39. A system as recited in claim 1, further comprising a unidirectional antenna disposed in a center of said service area and transmitting the same simulcast broadband signal into the serving area.

40. A system as recited in claim 39, wherein said transmitting antennas broadcast the same broadband signals.

41. A system as recited in claim 1, wherein said display devices each comprise a video display.

42. A system comprising:
a plurality of groups of spaced directional antennas disposed substantially on the peripheries of adjacent cells within a service area, said directional antennas propagating substantially simulcast signals in a first directional pattern into at least the cell bounded by the periphery with which the antenna is associated;
the propagation patterns of the directional antennas of a cell with whose periphery they are associated being of a shape and extent so as to overlap over substantially a major portion of the area enclosed within said periphery;

an omnidirectional antenna disposed at a center of said service area and propagating said substantially simulcast signals in a unidirectional pattern into said cells within said service area;

plural receivers in each of multiple cells receiving multiple time separated versions of said signals and having a signal processing device processing said versions of said signals to provide a substantially single output signal; and display devices connected to receive said substantially single output signal and provide a sensorially perceptible display corresponding to at least a portion of said substantially single output signal.

43. A system as in claim 42, wherein antennas disposed substantially on the peripheries of adjacent cells propagate signals into each of said adjacent cells in said directional patterns.

44. A system according to claim 43 wherein antennas disposed substantially on the peripheries of three adjacent cells propagate signals into each of said three adjacent cells in said directional patterns.

45. A system according to claim 42 wherein said transmitted signals are transmitted as spread spectrum signals and said receiver signal processing devices comprise despreaders and Rake processing devices.

46. A system according to claim 42 wherein said transmitted signals are transmitted as frequency hopping spread spectrum signals and said receiver signal processing devices comprise despreaders and Rake processing devices.

47. A system according to claim 42 wherein said transmitted signals are digitally modulated and are transmitted as frequency hopping spread spectrum signals and said receiver signal processing devices comprise despreaders and Rake processing devices.

48. A system according to claim 42 wherein said transmitted signals are QAM digitally modulated and are transmitted as frequency hopping spread spectrum signals and said receiver signal processing devices comprise despreaders and Rake processing devices.

49. A system according to claim 42 wherein said transmitted signals include multiplexed channels each including multiplexed streams of digital data.

50. A system according to claim 49 wherein said receivers include a demultiplexer, a decoder, and a demodulator.

51. A system according to claim 42 wherein said transmitted signals include multiplexed channels each including multiplexed streams of digitally modulated digital data transmitted as frequency hopping spread spectrum signals and said receiver signal processing devices comprise despreaders, Rake processing devices, demultiplexers, decoders, and demodulators.

52. A system according to claim 42 wherein the signals transmitted by said antennas are simulcast.

53. A system comprising:

a plurality of groups of spaced transmitting antennas disposed substantially on the peripheries of adjacent cells within a service area;

each of said transmitting antennas being directional and directed to propagate and substantially simulcast the same signals in a first directional pattern into at least the cell bounded by the periphery with which the antenna is associated, each of said cells in the service area receiving said same signals;

the propagation patterns of the transmitting antennas of a cell with whose periphery they are associated being of a shape and extent so as to overlap over substantially a major portion of the area enclosed within said periphery;

plural receivers in each of multiple cells receiving multiple time separated versions of said same signals and having a signal processing device processing said versions of said same signals to provide a substantially single output signal; and display devices connected to receive said substantially single output signal and provide a sensorially perceptible display corresponding to at least a portion of said substantially single output signal.

54. A system as recited in claim 53, wherein said same signals each comprise the same broadband data.

55. A system as recited in claim 53, wherein said same signals each comprise digital video data.

56. A system as in claim 53, wherein said same signals include multiplexed channels each including multiplexed streams of digital data.

* * * * *